US012614151B2

(12) United States Patent
Brown et al.

(10) Patent No.: US 12,614,151 B2
(45) Date of Patent: Apr. 28, 2026

(54) AUTOMATED CONTENT ASSESSMENT FOR COLLABORATION PLATFORMS

(71) Applicant: Atlassian Pty Ltd., Sydney (AU)

(72) Inventors: Tyler Brown, Madison, WI (US); Preethi Kandappan, San Jose, CA (US); Anand Srikrishnan Kashyap, Saratoga, CA (US)

(73) Assignee: ATLASSIAN PTY LTD., Sydney (AU)

( * ) Notice: Subject to any disclaimer, the term of this patent is extended or adjusted under 35 U.S.C. 154(b) by 127 days.

(21) Appl. No.: 18/755,273

(22) Filed: Jun. 26, 2024

(65) Prior Publication Data

US 2026/0004246 A1     Jan. 1, 2026

(51) Int. Cl.
*G06Q 10/10* (2023.01)
*G06Q 10/107* (2023.01)

(52) U.S. Cl.
CPC ......... *G06Q 10/103* (2013.01); *G06Q 10/107* (2013.01)

(58) Field of Classification Search
CPC .......................... G06Q 10/103; G06Q 10/107
See application file for complete search history.

(56) References Cited

U.S. PATENT DOCUMENTS

2020/0133711 A1* 4/2020 Webster .................... G06F 8/30
2023/0101588 A1* 3/2023 Dasdan ................. G06F 40/134
715/234

2023/0376515 A1* 11/2023 Tanikella ............. G06Q 10/101
2024/0296316 A1* 9/2024 Singh .................... G06N 3/0475
2025/0138842 A1* 5/2025 Lu ........................... G06F 9/451
2025/0140246 A1* 5/2025 Lee ..................... H04L 65/1089
2025/0348360 A1* 11/2025 Abadi ................... G06F 9/5027
2025/0356248 A1* 11/2025 Price ..................... G06N 20/00
2025/0356313 A1* 11/2025 Pollock ............... G06Q 10/101

OTHER PUBLICATIONS

Zhu, Y., Wu, L., Guo, Q., Hong, L., & Li, J. (May 2024). Collaborative large language model for recommender systems. In Proceedings of the ACM Web Conference 2024 (pp. 3162-3172). (Year: 2024).*

* cited by examiner

*Primary Examiner* — John S. Wasaff
(74) *Attorney, Agent, or Firm* — Brownstein Hyatt Farber Schreck, LLP

(57) ABSTRACT

Embodiments described herein relate to systems and methods for automated content assessment for collaboration platforms. An automation rule may be established that uses a condition component that utilizes a generative output engine. A trigger component may trigger the automation rule to run, for example when an object is created or modified. A content portion from the object may be used to generate a condition prompt for the generative output engine that also includes a classifier string for the content portion and a set of example input-output content to classifier pairs. Based on a returned generative response, the condition component of the automation rule may be satisfied, and one or more next components of the automation rule performed in response. In some examples, the next component may include actions or additional conditions that utilize the generative output engine.

18 Claims, 20 Drawing Sheets

1100

GENERATE GUI WITH AUTOMATION RULE INPUT FIELD —1102

SELECT TRIGGER COMPONENT —1104

SELECT CONDITION THAT USES A GENERATIVE OUTPUT ENGINE —1106

SELECT OBJECT FOR CONDITION —1108

SELECT INSTRUCTIONS FOR CONDITION —1110

ADD NEXT COMPONENTS TO THE AUTOMATION RULE —1112

SAVE THE AUTOMATION RULE AND GENERATE A SERVICE —1114

1200

1800

PROMPT CONSTRUCTION ~1802

GENERATIVE OUTPUT ENGINE(S) ~1804

GENERATIVE OUTPUT ROUTER ~1806

1808

API REQUEST HANDLER

1810

FRONTEND UI CONTROLLER

2000

2002 — PROCESSING UNIT

2004 — MEMORY

2014

2006 — INPUT DEVICE

2008 — DISPLAY

2010 — OUTPUT DEVICE

2012 — POWER SOURCE

AUTOMATED CONTENT ASSESSMENT FOR COLLABORATION PLATFORMS

TECHNICAL FIELD

Embodiments described herein relate to multi-tenant services of collaborative work environments and, in particular, to systems and methods for automated content assessment for collaboration platforms.

BACKGROUND

An organization can establish a collaborative work environment by self-hosting, or providing its employees with access to, a suite of discrete software platforms or services to facilitate cooperation and completion of work. In many cases, the organization may also define policies outlining best practices for interacting with, and organizing data within, each software platform of the suite of software platforms.

Often internal best practice policies require employees to thoroughly document completion of tasks, assignment of work, decision points, and so on. Such policies additionally often require employees to structure and format documentation in particulars ways, to copy data or status information between multiple platforms at specific times, or to perform other rigidly defined, policy-driven, tasks. These requirements are both time and resource consuming for employees, reducing overall team and individual productivity.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
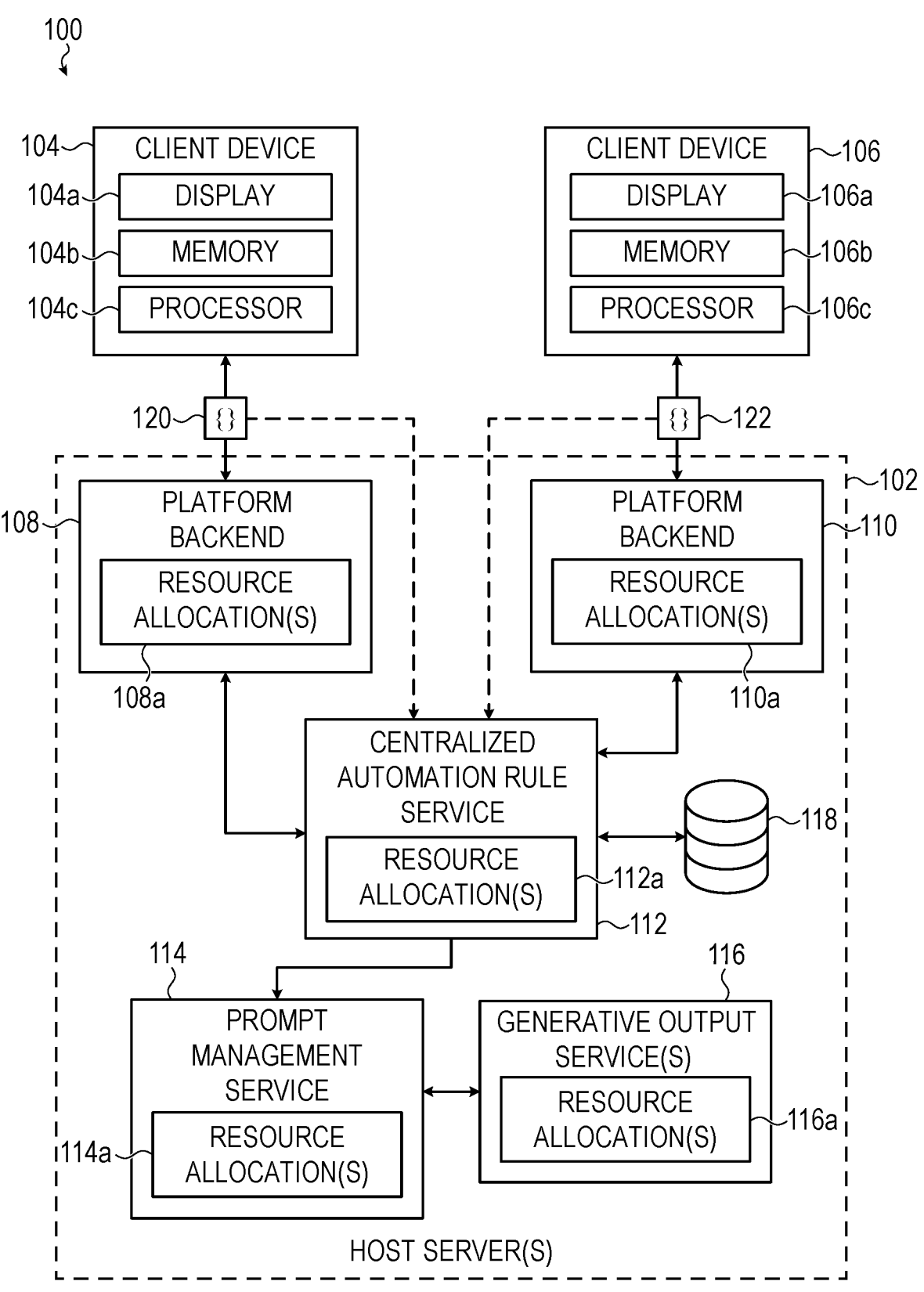
FIG. 1 depicts a simplified diagram of a system that includes a centralized automation rule service for the creation of automation rules.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems, devices, and methods for automatically generating rules for collaboration platforms, such as documentation systems, issue tracking systems, project management platforms, and the like.

Collaboration platforms can be used to generate, store, and organize user-generated content. As described herein, a collaboration platform or service may include an editor that is configured to receive user input and generate user-generated content that is saved as a content item. The terms "collaboration platform" or "collaboration service" may be used to refer to a documentation platform or service configured to manage electronic documents or pages created by the system users, an issue tracking platform or service that is configured to manage or track issues or tickets in accordance with an issue or ticket workflow, a source code management platform or service that is configured to manage source code and other aspects of a software product, a manufacturing resource planning platform or service configured to manage inventory, purchases, sales activity or other aspects of a company or enterprise. The examples provided herein are described with respect to an editor that is integrated with the collaboration platform. In some instances, the functionality described herein may be adapted to multiple platforms or adapted for cross-platform use through the use of a common or unitary editor service. For example, the functionality described in each example is provided with respect to a particular collaboration platform, but the same or similar functionality can be extended to other platforms by using the same editor service. Also, as described above a set of host services or platforms may be accessed through a common gateway or using a common authentication scheme, which may allow a user to transition between platforms and access platform-specific content without having to enter user credentials for each platform.

An automation rule (which may also be referred to as "automated rules," or simply "rules") is an automated workflow that is generally constructed in a "if this, then that" format. Typically, for example a collaboration platform, an automation rule results in the performance of an action upon the occurrence of a trigger, if certain conditions are met. In a collaboration platform, each automation rule is made by combining different types of components, including triggers and actions. An automation rule typically also includes a condition. Branches may also be used in some cases. As used herein, automation rules begin with a trigger (which may also be referred to as a trigger component), the trigger being the catalyst that sets the execution of a rule in motion. In one or more embodiments, a condition (which may also be referred to as a condition component) may also be used, where the condition is a limit on the scope of the automation rule. For example, a condition may require that the rule may only be run when the action that initiated the trigger was performed by a certain user or group of users. As used herein, an action (or action component) is what the rule to does or performs, for example what happens when the trigger (and conditions if applicable) is met. In some embodiments, an automation rule may also include a branch. A branch expands the performance or execution of a rule by adding a secondary path (a branch). As used herein, a branch is a sequence of conditions and/or actions that run in isolation from the rest of the rule, but are applied to each (e.g., every) instance of an object. For example, the rule for each task (e.g., an object) can be branched so that a message is sent to a recipient every time a person is mentioned on a particular page (e.g., when such page is published). This branch action occurs in addition to any action on the primary path of the automation rule chain.

In some cases, a collaboration platform may include a large amount of content to be managed. Certain tasks may require many repetitive actions or a person responsible for managing content may not realize that an action needs to be performed to manage the content. As such, a collaboration platform may benefit from allowing users to establish automation rules to automatically perform such tasks that would otherwise need to be performed manually. Such automation rules can reduce management overhead, saving time and freeing up resources, and add management consistency, increasing transparency and organization, while reducing errors.

However, determining whether a condition that needs to be met to run an automation rule may be difficult. For example, a user may desire that an automation rule run whenever a page is generated related to a particular marketing objective. If this marketing objective can be identified using a specific term that is only used in that context, then an automation rule could be based on the presence of this term. However, such one-to-one mapping is often absent. As such, pages for that market objective could be excluded if the term is not used. Also, irrelevant pages could be included if the term is also used in other contexts. As such, improved, more reliable ways of determining whether a condition has been met for purposes of running an automation rule are desired.

Automation rule creation (building) and automated content assessment for collaboration systems (e.g., using the automation rule) is further described herein. In one or more embodiments, a condition (condition component) of an automation rule may use a generative output engine (e.g., which may use or be referred to as Atlassian intelligence (AI) in some cases). In some embodiments, an action (action component) of an automation rule may additionally, or alternatively, use a generative output engine in performance of the action and automation rule.

In one or more embodiments, a user of a collaboration system, or a platform thereof (e.g., a user of one or more systems, programs, applications, or components of a collaboration platform), can generate an automation rule in an automation rule builder. The automation rule builder presents a graphical user interface (GUI) of the collaboration system (e.g., of one of the platforms of the collaboration system). Automation rule components, including triggers, conditions, and actions, have corresponding graphical elements that are generated for the GUI, and displayed for a user. A user may select a condition component for the automation rule that uses a generative output engine (e.g., an AI condition). The user specifies the object on which the condition is evaluated, which may be the same object as the object that triggered the automation rule in some examples. Additionally, the user specifies one or more classifier strings for the condition, or an indication of a classifier string. Generally, the classifier is a string that is evaluated by the generative output engine with reference to a content portion of the object being evaluated. In some embodiments, the content portion may be text (e.g., a string or text block). In other embodiments, the content portion may include markup content, dynamic text references, links, icons, images, or a combination of these. For example, the content portion may be a text string together with one or more images and dynamic text references. The user may specify other conditions, including other conditions that use a generative output engines, and one or more actions for the automation rule.

In one or more embodiments, a service is established within the collaboration system, or a platform thereof, based on the automation rule. When the trigger associated with the automation rule is detected, the conditions of the automation rule using the generative output engine are evaluated. A prompt for the generative output engine is generated that includes the content portion from the object, classifier string, and a set of example input-output content to classifier pairs. The prompt is then provided to the generative output engine, which returns a result that is used to determine whether the condition is satisfied. For example, whether the object (e.g., the content portion) relates to the relevant classifier. If the condition is satisfied, other conditions and actions of the automation rule may be performed.

The described conditions using a generative output engine can more accurately determine whether a condition is satisfied, including better resolving ambiguity and reducing false positives. Automation rules using such conditions as further described herein can therefore save time, lower expenses, reduce errors, increase engagement with collaboration systems, and otherwise perform administrative and management tasks more effectively and efficiently.

FIG. 1 depicts a simplified diagram of a system that includes a centralized automation rule service for the creation of automation rules, as described herein. The system 100 is depicted as implemented in a client-server architecture, but it may be appreciated that this is merely one example and that other communications architectures are possible.

In particular the system 100 includes a set of host servers 102 which may be one or more virtual or physical computing resources (collectively referred in many cases as a "cloud platform"). In some cases, the set of host servers 102 can be physically collocated or in other cases, each may be positioned in a geographically unique location.

The set of host servers 102 can be communicably coupled to one or more client devices. Two example devices are shown as the client device 104 and the client device 106. The client devices 104, 106 can be implemented as any suitable electronic device. In many embodiments, the client devices 104, 106 are personal computing devices such as desktop computers, laptop computers, or mobile phones.

The set of host servers 102 can be supporting infrastructure for one or more backend applications, each of which may be associated with a particular software platform, such as a documentation platform or an issue tracking platform. Other examples are information technology system management (ITSM) systems, chat platforms, messaging platforms, and the like. These backends can be communicably coupled to a centralized automation rule service that can be leveraged to provide functionality to each respective backend. For example, the centralized automation rule service can be configured to receive user prompts, such as described herein, to modify, create, or otherwise perform operations to build, validate, debug, or otherwise create and manage automation rules acting on content stored by each respective software platform and triggered by events that may occur at one or more of the software platforms. The centralized automation rule service may provide a single, unified interface to automation rules that operate across different platforms of the host servers 102, providing management and creation capabilities across different platforms of the system.

By centralizing the automation rule service in this manner, the centralized automation rule service can also serve as an integration between multiple platforms. For example, one platform may be a documentation platform and the other platform may be an issue tracking system. In these examples, a user of the documentation platform may create an automation rule that is triggered off of an event that occurs at the documentation platform. An action in response to this event may be performed on one or more objects of the issue tracking system.

A portion of the set of host servers 102 can be allocated as physical infrastructure supporting a first platform backend 108 and a different portion of the set of host servers 102 can be allocated as physical infrastructure supporting a second platform backend 110.

The two different platforms may be instantiated over physical resources provided by the set of host servers 102. Once instantiated, the first platform backend 108 and the second platform backend 110 can each be communicably coupled with a centralized automation rule service 112 (also referred to as an "automation rule builder" or an "automation rule manager").

The centralized automation rule service 112 can be configured to cause rendering of a GUI within respective frontends of each of the first platform backend 108 and the second platform backend 110. In this manner, and as a result of this construction, each of the first platform and the second platform present a consistent automation rule creation and management experience for a user.

The centralized automation rule service 112 may include both text input functions as well as selectable graphical elements to select and edit automation rules and components. Selected graphical elements may represent triggers and/or action across different platforms. As a result of the text input or selection of graphical elements, the centralized automation rule service 112 may present graphical elements representing the selected components that make up an automation, for example on the display 104*a* of a client device 104, or on the display 106*a* of the client device 106. As a result of this centralized architecture, multiple platforms in a multiplatform environment can leverage the features of the automation rule service. This provides a consistent experience to users while providing for cross-platform features for the automation rules.

For example, in one embodiment, a user in a multiplatform environment may use and operate a documentation platform and an issue tracking platform. In this example, both the issue tracking platform and the documentation platform may be associated with a respective frontend and a respective backend. Each platform may be additionally communicably and/or operably coupled to a centralized automation rule service 112 that can be called by each respective frontend whenever it is required to present the user of that respective frontend with an interface to create and manage automation rules.

As described herein, a "content editing frame" references a user interface element that can be leveraged by a user to draft and/or modify rich content including, but not limited to formatted text; image editing; data tabling and charting; file viewing; and so on. These examples are not exhaustive; the content editing elements can include and/or may be implemented to include many features, which may vary from embodiment to embodiment. For simplicity of description the embodiments that follow reference a centralized automation rule service 112 configured for rich text editing, but it may be appreciated that this is merely one example.

As a result of architectures described herein, developers of software platforms that would otherwise dedicate resources to developing, maintaining, and supporting content editing features can dedicate more resources to developing other platform-differentiating features, without needing to allocate resources to development of software components that are already implemented in other platforms.

In addition, as a result of the architectures described herein, services supporting the centralized automation rule service 112 can be extended to include additional features and functionality that, in turn, can automatically be leveraged by any further platform that incorporates an automation rule builder, and/or otherwise integrates with the centralized automation rule service 112 itself.

In some examples, prompts can be provided as input to a prompt engineering/prompt preconditioning service (such as the prompt management service 114) that, in turn, provides a modified user prompt as input to a generative output service 116. The generative output service 117 may be hosted over the host servers 102 or, in other cases, may be a software instance instantiated over separate hardware. In some cases, the generative output service 116 may be a third party service that serves an API interface to which one or more of the host services and/or preconditioning service can communicably couple.

The generative output engine can be configured as described above to provide any suitable output, in any suitable form or format. Examples include content to be added to user-generated content, API request bodies, replacing user-generated content, and so on. In some cases, the generative output service 116 can be configured to provide an output as part of an action of an automation rule. The output can be in response to a prompt that includes content referenced by the automation rule, for example a summary of the content created when the automation rule is triggered and run.

Alternatively, when interacting with the same documentation system, a user having a role of "human resources professional" may be presented with prompts associated with manipulating or summarizing information presented in a directory system or a benefits system, instead of the issue tracking system or the code repository system.

More generally, in some embodiments described herein, a centralized automation rule service 112 can be configured to suggest to a user one or more prompts that can cause a generative output engine to provide useful output and/or perform a useful task for the user. These suggestions/prompts can be based on the user's role, a user interaction history by the same user, user interaction history of the user's colleagues, or any other suitable filtering/selection criteria.

In addition to the foregoing, a centralized automation rule service 112 as described herein can be configured to suggest discrete commands that can be performed by one or more platforms. As with preceding examples, the ordering of the suggestion list and/or the content of the suggestion list may vary from embodiment to embodiment and user to user. For example, the commands and/or command types presented to the user may vary based on that user's history, the user's role, and so on.

More specifically, the first platform backend 108 can be configured to communicably couple to a first platform frontend instantiated by cooperation of a memory and a processor of the client device 104. Once instantiated, the first platform frontend can be configured to leverage a display of the client device 104 to render a GUI so as to present information to a user of the client device 104 and so as to collect information from a user of the client device 104. Collectively, the processor 104c, memory 104b, and display 104a of the client device 104 are identified as the resources of the client devices, respectively.

As with many embodiments described herein, the first platform frontend can be configured to communicate with the first platform backend 108 and/or the centralized automation rule service 112. Information can be transacted by and between the frontend, the first platform backend 108 and the centralized automation rule service 112 in any suitable manner or form or format. In many embodiments, as noted above, the client device 104 and in particular the first platform frontend can be configured to send an authentication token 120 along with each request transmitted to any of the first platform backend 108 or the centralized automation rule service 112 or the preconditioning service or the generative output engine.

Similarly, the second platform backend 110 can be configured to communicably couple to a second platform frontend instantiated by cooperation of a memory and a processor of the client device 106. Once instantiated, the second platform frontend can be configured to leverage a display of the client device 106 to render a GUI so as to present information to a user of the client device 106 and to collect information from a user of the client device 106. Collectively, the processor 106c, memory 106b, and display 106a of the client device 106 are identified as the client devices resources, respectively.

As with many embodiments described herein, the second platform frontend can be configured to communicate with the second platform backend 110 and/or the centralized automation rule service 112. Information can be transacted by and between the frontend, the second platform backend 110 and the centralized automation rule service 112 in any suitable manner or form or format. In many embodiments, as noted above, the client device 106 and in particular the second platform frontend can be configured to send an authentication token 122 along with each request transmitted to any of the second platform backend 110 or the centralized automation rule service 112.

As a result of these constructions, the centralized automation rule service 112 can provide uniform feature sets to users of either the client device 104 or the client device 106. For example, the centralized automation rule service 112 can implement an automation rule processor to receive an automation rule input provided by a user of the client device 104 to the first platform and/or to receive an automation rule input provided by a different user of the client device 106 to the second platform. Created automation rules may then be accessible to each user via the different ones of client device 104 and client device 106 for management, editing, and so on.

As noted above, the centralized automation rule service 112 ensures that common features are available to frontends of different platforms. One such class of features provided by the centralized automation rule service 112 invokes output of a generative output engine of a service such as the generative output service 116. For example, as noted above, the generative output service 116 can be used to generate content, supplement content, and/or generate API requests or API request bodies that cause one or both of the first platform backend 108 or the second platform backend 110 to perform a task. In some cases, an API request generated at least in part by the generative output service 116 can be directed to another system (not depicted with reference to system 100). For example, the API request can be directed to a third-party service (e.g., referencing a callback, as one example, to either backend platform) or an integration software instance. The integration may facilitate data exchange between the second platform backend 110 and the first platform backend 108 or may be configured for another purpose.

The prompt management service 114 can be configured to receive user input (provided via a GUI of the client device 104 or the client device 106) from the centralized automation rule service 112. The prompt management service 114 can also be configured to receive an automation rule input from the centralized automation rule service 112 in connection with running of an automation rule. The user input or automation rule input may include a prompt to be continued by the generative output service 116. The prompt management service 114 can be configured to modify the user input or automation rule input, to supplement the input, select a prompt from a database (e.g., the database 118) based on the input, insert the input into a template prompt, replace words within the input, preform searches of databases (such as user graphs, team graphs, and so on) of either the first platform backend 108 or the second platform backend 110, change grammar or spelling of the input, change a language of the input, and so on. The prompt management service 114 may also be referred to herein as an "editor assistant service" or a "prompt constructor." In some cases, the prompt management service 114 is also referred to as a "content creation and modification service."

Output of the prompt management service 114 can be referred to as a modified prompt or a preconditioned prompt. This modified prompt can be provided to the generative output service 116 as an input. More particularly, the prompt management service 114 is configured to structure an API request to the generative output service 116. The API request can include the modified prompt as an attribute of a structured data object that serves as a body of the API request. Other attributes of the body of the API request can include, but are not limited to: an identifier of a particular LLM or generative engine to receive and continue the modified prompt; a user authentication token; a tenant authentication token; an API authorization token; a priority level at which the generative output service 116 should process the request; an output format or encryption identifier; and so on. One example of such an API request is a POST request to a Restful API endpoint served by the generative output service 116. In other cases, the prompt management service 114 may transmit data and/or communicate data to the generative output service 116 in another manner (e.g., referencing a text file at a shared file location, the text file including a prompt, referencing a prompt identifier, referencing a callback that can serve a prompt to the generative output service 116, initiating a stream comprising a prompt, referencing an index in a queue including multiple prompts, and so on; many configurations are possible).

In response to receiving a modified prompt as input, the generative output service 116 can execute an instance of a generative output engine, such as an LLM. As noted above, in some cases, the prompt management service 114 can be configured to specify what engine, engine version, language, language model or other data should be used to continue a particular modified prompt.

The selected LLM or other generative engine continues the input prompt and returns that continuation to the caller, which in many cases may be the prompt management service 114. In other cases, output of the generative output service 116 can be provided to the centralized automation rule service 112 to return to a suitable backend application, to in turn return to or perform a task for the benefit of a client device such as the client device 104 or the client device 106. More particularly, it may be appreciated that although system 100 is illustrated with only the prompt management service 114 communicably coupled to the generative output service 116, this is merely one example and that in other cases the generative output service 116 can be communicably coupled to any of the client device 106, the client device 104, the first platform backend 108, the second platform backend 110, the centralized automation rule service 112, or the prompt management service 114.

In some cases, output of the generative output service 116 can be provided to an output processor or gateway configured to route the response to an appropriate destination. For example, in an embodiment, output of the generative engine may be intended to be prepended to an existing document of a documentation system. In this example, it may be appropriate for the output processor to direct the output of the generative output service 116 to the frontend (e.g., rendered on the client device 104, as one example) so that a user of the client device 104 can approve the content before it is prepended to the document. In another example, output of the generative output service 116 can be inserted into an API request directly to a backend associated with the documentation system. The API request can cause the backend of the documentation system to update an internal object representing the document to be updated. On an update of the document by the backend, a frontend may be updated so that a user of the client device can review and consume the updated content.

In other cases, the output processor/gateway can be configured to determine whether an output of the generative output service 116 is an API request that should be directed to a particular endpoint. Upon identifying an intended or specified endpoint, the output processor can transmit the output, as an API request to that endpoint. The gateway may receive a response to the API request which in some examples, may be directed to yet another system (e.g., a notification that an object has been modified successfully in one system may be transmitted to another system).

More generally, some embodiments described herein, and with particular reference to system 100, relate to systems for running automation rules. Those automation rules may collect one or more portions of content of the system 100, modify that user input into a particular engineered prompt, and submit that prompt as input to a trained large language model. Output of the LLM can be used in a number of suitable ways.

These foregoing embodiments depicted with reference to system 100 and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

For example, it may be appreciated that all software instances described above are supported by and instantiated over physical hardware and/or allocations of processing/memory capacity of physical processing and memory hardware. For example, the first platform backend 108 may be instantiated by cooperation of a processor and memory collectively represented in the figure as the resource allocations 108a.

Similarly, the second platform backend 110 may be instantiated over the resource allocations 110a (including processors, memory, storage, network communications systems, and so on). Likewise, the centralized automation rule service 112 is supported by a processor and memory and network connection (and/or database connections) collectively represented for simplicity as the resource allocations 112a.

The prompt management service 114 can be supported by its own resources including processors, memory, network connections, displays (optionally), and the like represented in the figure as the resource allocations 114a.

In many cases, the generative output service 116 may be an external system, instantiated over external and/or third-party hardware which may include processors, network connections, memory, databases, and the like. In some embodiments, the generative output service 116 may be instantiated over physical hardware associated with the host servers 102. Regardless of the physical location at which (and/or the physical hardware over which) the generative output service 116 is instantiated, the underlying physical hardware including processors, memory, storage, network connections, and the like are represented in the figure as the resource allocations 116*a*.

Further, although many examples are provided above, it may be appreciated that in many embodiments, user permissions and authentication operations are performed at each communication between different systems described above. Phrased in another manner, each request/response transmitted as described above or elsewhere herein may be accompanied by user authentication tokens, user session tokens, API tokens, or other authentication or authorization credentials.

Generally, generative output systems, as described herein, should not be usable to obtain information from an organization's datasets that a user is otherwise not permitted to obtain. For example, a prompt of "generate a table of social security numbers of all employees" should not be executable. In many cases, underlying training data may be siloed based on user roles or authentication profiles. In other cases, underlying training data can be preconditioned/scrubbed/tagged for particularly sensitive datatypes, such as personally identifying information. As a result of tagging, prompts may be engineered to prevent any tagged data from being returned in response to any request. More particularly, in some configurations, all prompts output from the prompt management service 114 may include a phrase directing an LLM to never return particular data, or to only return data from particular sources, and the like.

In some embodiments, the system 100 can include a prompt context analysis instance configured to determine whether a user issuing a request has permission to access the resources required to service that request. For example, a prompt from a user may be "Generate a text summary in Document123 of all changes to KanbanBoard456 that do not have a corresponding issue tagged in the issue tracking system." In respect of this example, the prompt context analysis instance may determine whether the requesting user has permission to access Document123, whether the requesting user has written permission to modify Document123, whether the requesting user has read access to KanbanBoard456, and whether the requesting user has read access to the referenced issue tracking system. In some embodiments, the request may be modified to accommodate a user's limited permissions. In other cases, the request may be rejected outright before providing any input to the generative output service 116.

Furthermore, the system can include a prompt context analysis instance or other service that monitors user input and/or generative output for compliance with a set of policies or content guidelines associated with the tenant or organization. For instance, the service may monitor the content of a user input and block potential ethical violations including hate speech, derogatory language, or other content that may violate a set of policies or content guidelines. The service may also monitor output of the generative engine to ensure the generative content or response is also in compliance with policies or guidelines. To perform these monitoring activities, the system may perform natural language processing on the monitored content in order to detect key words or phrases that indicate potential content violations. A trained model may also be used that has been trained using content known to be in violation of the content guidelines or policies.

Further to these foregoing embodiments, it may be appreciated that a user can provide input to a frontend of a system in a number of suitable ways, including by providing input as described above to a frame rendered with support of a centralized automation rule service.

As further described herein, the system 100 supports automation rule creation. In one or more embodiments, a GUI is displayed at a client device that includes an input field. In some cases, the client device 104, associated with the first platform backend 108, provides an interface with a first type of software platform, and the client device 106, associated with the second platform backend 110, provides an interface with a different type of software platform. Either or both of client device 104 or client device 106 may generate a GUI allowing user input for automation rule generation. As further described herein, the host servers 102 can utilize the services of a generative output service 116 to programmatically generate automation rules or portion of automation rules from inputs, including one or more natural language inputs or selections of graphical elements. In some examples, the generative output service 116 can be used to provide indications (e.g., suggestions, recommendations) for automation rule components for selection by a user as part of automation rule building and creation.

Figure 2:
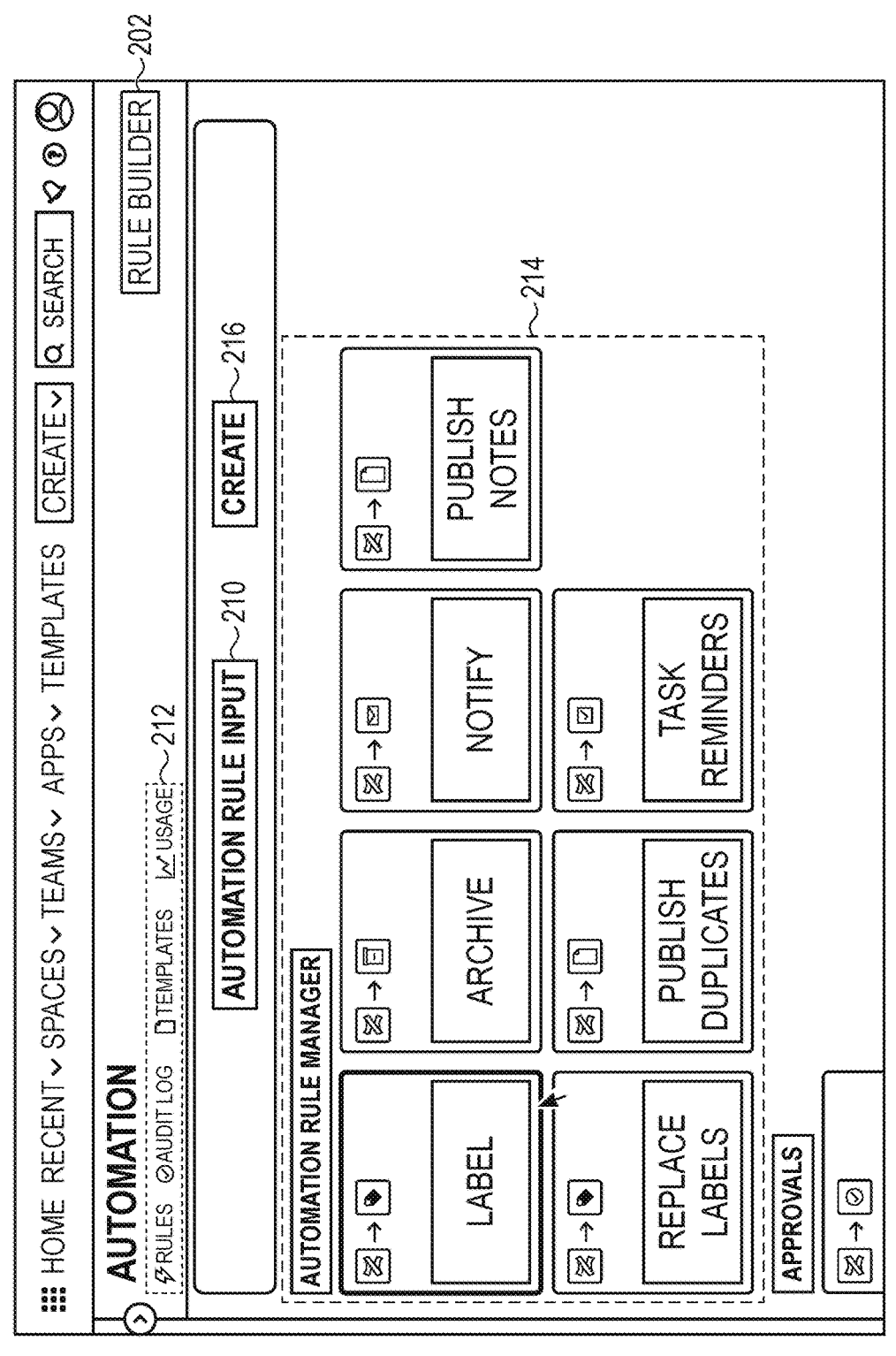
FIG. 2 depicts an example frontend interface that supports automation rule creation and automated content assessment for collaboration platforms.

FIG. 2 depicts an example frontend interface 200 that supports automation rule creation and automated content assessment for collaboration platforms, in accordance with aspects described herein. Frontend interface 200 may also be referred to as a UI or GUI. The frontend interface 200 can be rendered by a client device 104 or a client device 106, which may be a personal electronic device such as a laptop, desktop computer, tablet, and the like. The client device can include a display with an active display area in which a user interface, e.g., frontend interface 200 can be rendered. The user interface can be rendered by operation of an instance of a frontend application associated with a backend application that collectively defines a software platform as described herein.

More particularly, as described with reference to system 100, a platform can be defined by communicably intercoupling one or more frontend instances with one or more backend instances. The backend instance of software can be instantiated over server hardware such as a processor, memory, storage, and network communications. The frontend application can be instantiated over physical hardware of a client device in network communication with the backend application instance. The frontend application can be a native application, a browser application, or other application type instantiated over hardware directly or indirectly, such as within an operating system environment.

As shown, frontend interface 200 includes rule builder button 202, a text input field 210, selectable tabs 212, a display area 214, and a create button 216. Text input field 210 is a field configured to accept textual inputs, for example a natural language rule for the creation of automation rules. The create button 216 can be used to submit the textual input in the text input field 210 for creation of an automation rule by the system 100, for example using or aided by a generative output service.

In one or more embodiments, selectable tabs 212 include tabs for "rules," "an audit log," "templates," and "usage," each of which may cause a different display to appear in display area 214. Selecting the rules field causes the display area 214 to display automation rules for management. The information for the displayed rule can include at least a name, description scope (e.g., on what projects, or types of projects, the rule will run), an indication of whether to allow the rule to run from another rule, an error notification status, an owner of the rule, a rule actor (e.g., the party indicated as responsible when the rule is executed), and permissions for the rule (e.g., persons or groups allowed to modify the rule). As an example of automation rules, an automation rule manager may display a list, icon, or other indicator of automation rules created by a user in display area 214. Examples of such automation rules (e.g., created or for a template, as further discussed herein) include a "label" rule (e.g., adding a specific label when a page is published by a certain author), an "archive" rule (e.g., archiving inactive pages when scheduled (recurring)), a "notify" rule (e.g., notify certain people about inactive pages when scheduled (recurring)), a "publish notes" rule (e.g., publish new meeting notes page when scheduled (recurring)), a "replace labels" rule (e.g., replace a label on all pages when scheduled (recurring)), a "publish duplicates" rule (e.g., publish the same set of pages when a new space is created), and a "task reminders" rule (e.g., remind teammates about incomplete tasks when scheduled (recurring)). In some embodiments, these example rules may support automation rules within a documentation platform. In other embodiments such rules, or other rules, can be for other platforms or a combination of platforms within a system including collaboration platforms.

In one or more embodiments, selecting the templates tab may cause a display to appear in display area 214 that includes templates that a user may utilize to create automation rules from a template. Such templates provide predefined structure for common automation rules that a user may want to use in the manual creation of an automation rule.

In one or more embodiments, selecting the audit log tab may cause a display to appear in display area 214 that includes an audit log for the automation rules. In one or more embodiments, each automation rule may include an audit log that identifies when the automation rule was triggered, the final result of the execution of the automation rule, and any action performed as a result of the automation rule execution. In some embodiments, the audit log may indicate a duration of the execution and the status (e.g., success, error, and so on) of the execution.

In one or more embodiments, selecting the usage tab may cause a display to appear in display area 214 that includes usage information for the automation rules. The usage information includes an outline of your automation usage (e.g., for a particular time frame). For example, each automation rule may be identified, together with a quantity of runs/executions of the automation rule, an "owner" or other responsible person for the rule, a scope of the rule (e.g., which collaboration systems are associated with the rule), and an activation status for the automation rule (e.g., whether execution of the rule is turned "on" or "off").

According to one or more embodiments, previously-created automation rules, including automation rules generated from using a generative output engine, as further described herein, can be stored at the system 100. In some examples, rules may be stored in a database 118 for retrieval and use by a component of the set of host servers 102, such as the centralized automation rule service 112, the first platform backend 108, or the second platform backend 110. In some examples, the rules may be stored in the resource allocation of a portion of the host servers 102, such as the resource allocation of the platform from which the automation rule is to be executed, for example resource allocations 108a of the first platform backend 108, or resource allocations 110a of the second platform backend 110.

In one or more embodiments, the rule builder button 202 may be selected by a user to direct the frontend interface 200 to a rule builder that can be leveraged by a user to generate automation rules from components with assistance from graphical elements, as further described herein.

Figure 3:
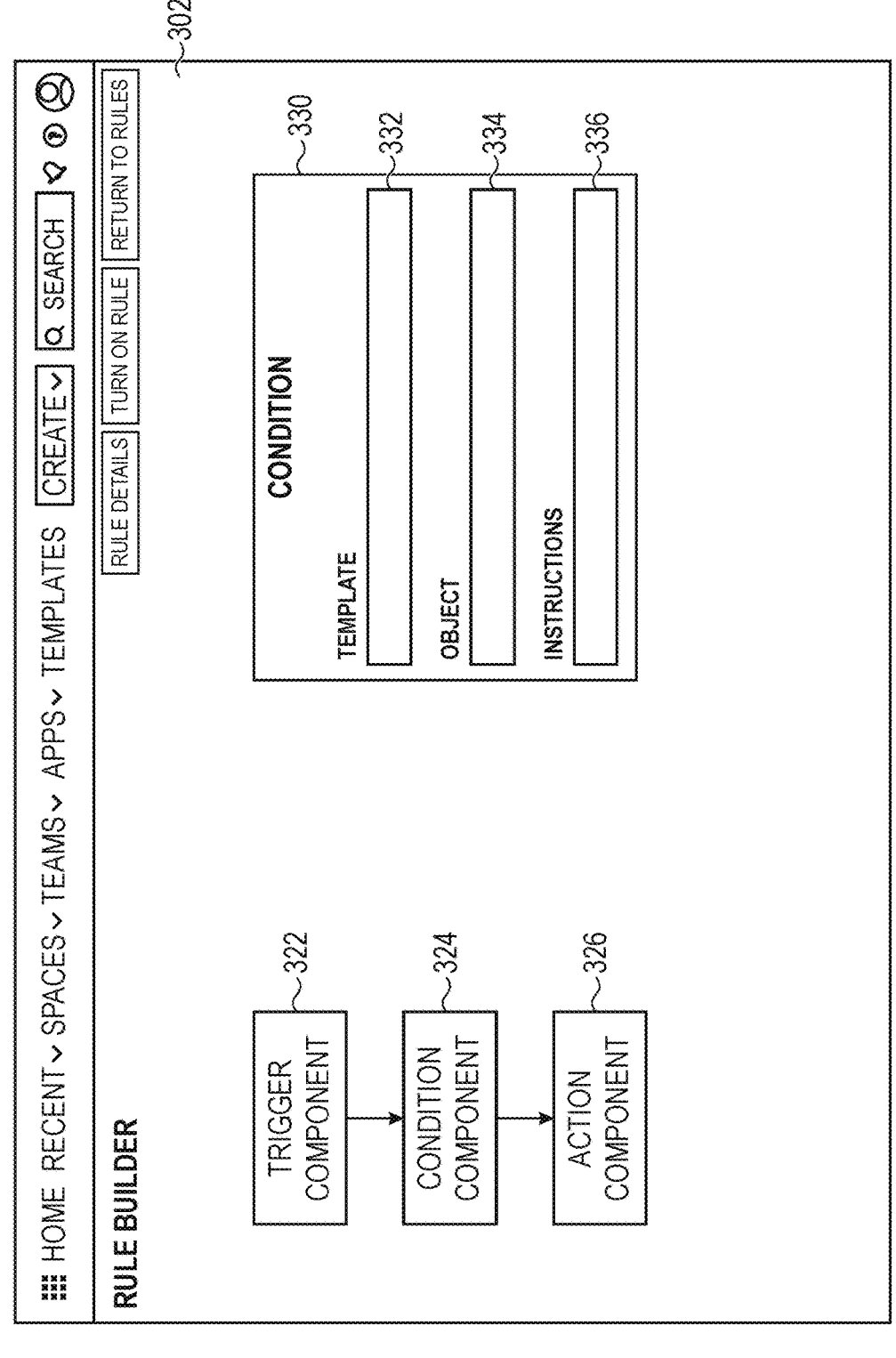
FIG. 3 depicts an example frontend interface that supports automation rule creation and automated content assessment for collaboration platforms.
Figure 4:
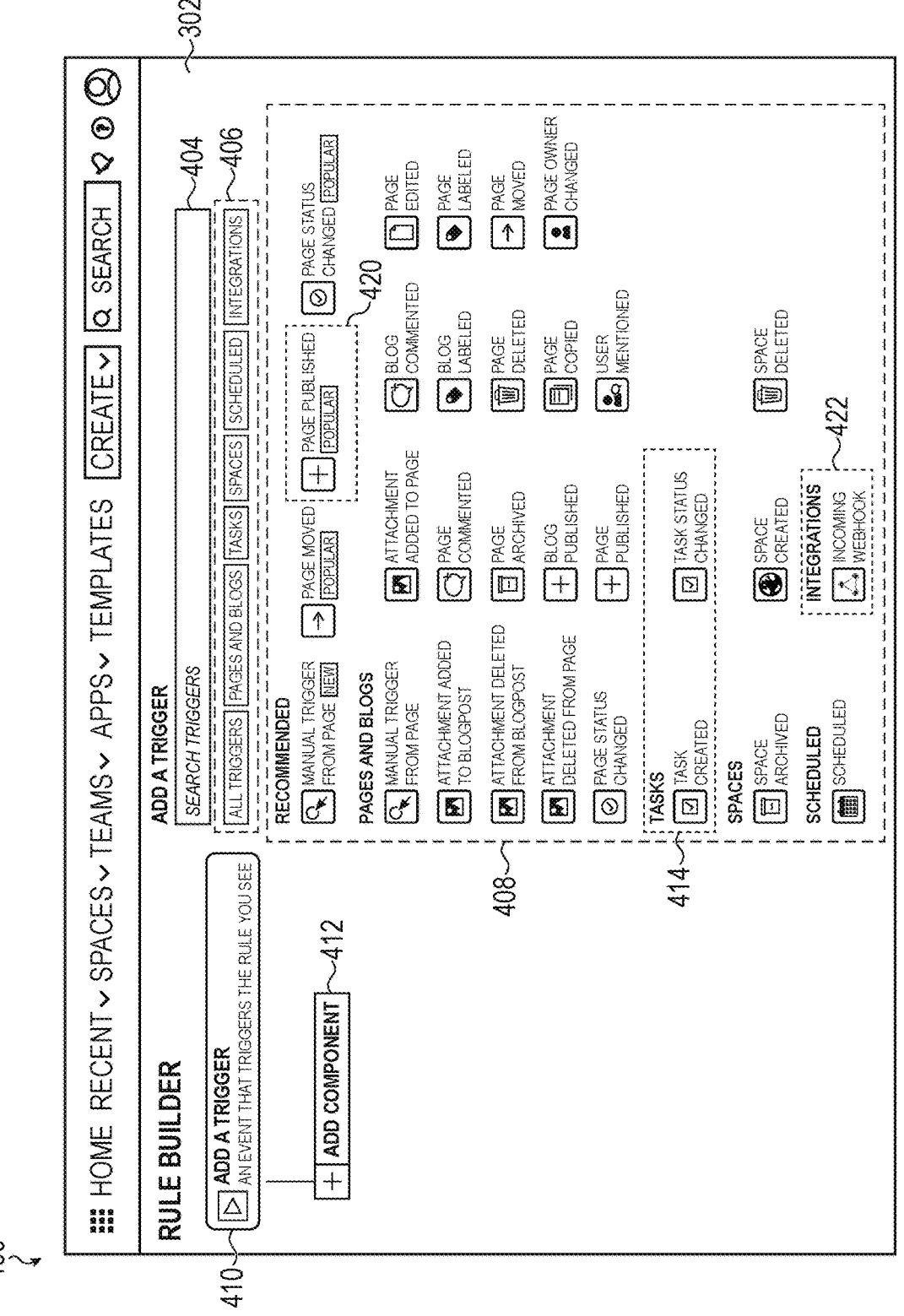
FIG. 4 depicts an example frontend interface that supports automation rule creation and automated content assessment for collaboration platforms.
Figure 5:
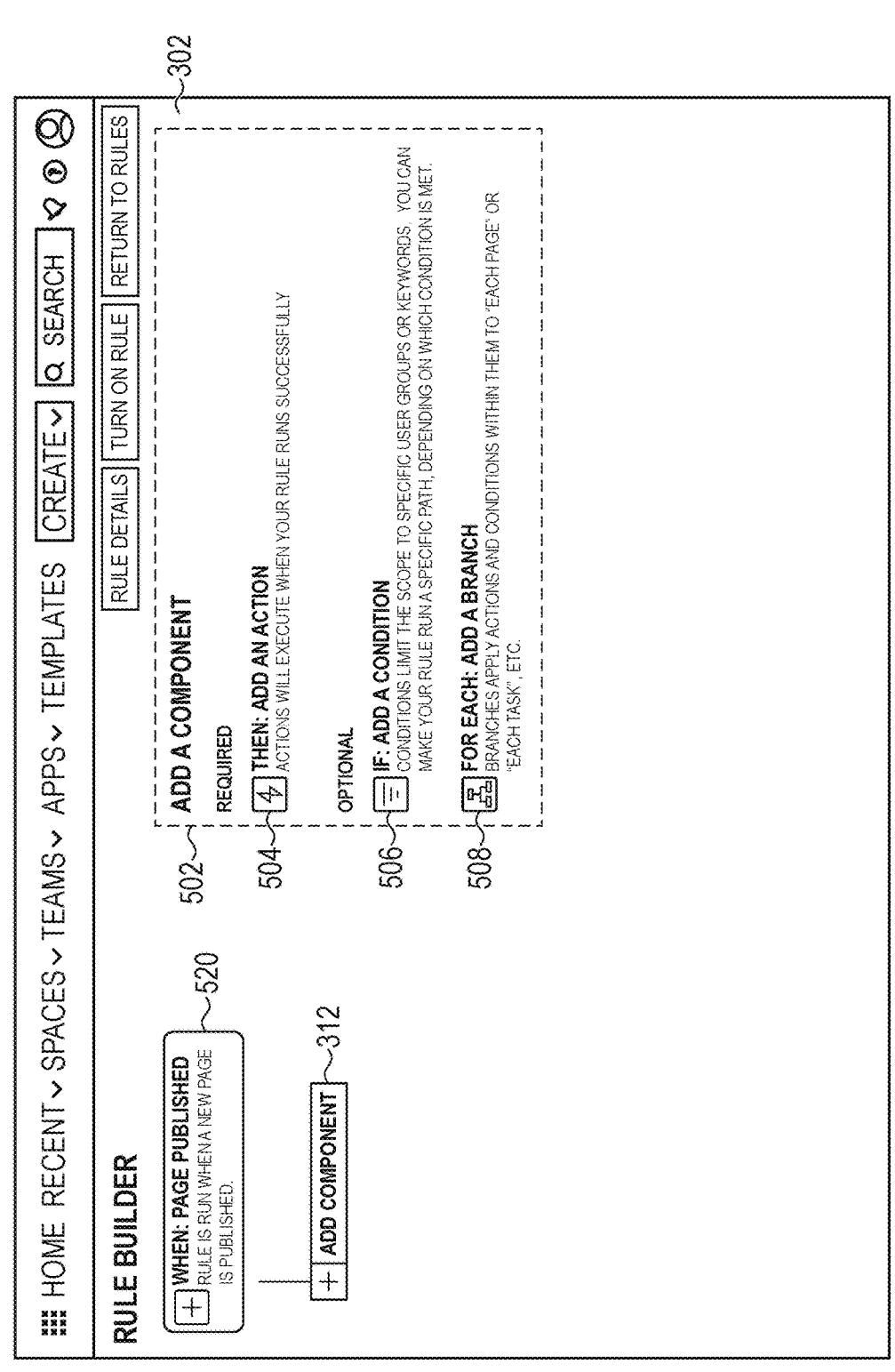
FIG. 5 depicts an example frontend interface that supports automation rule creation and automated content assessment for collaboration platforms.
Figure 6:
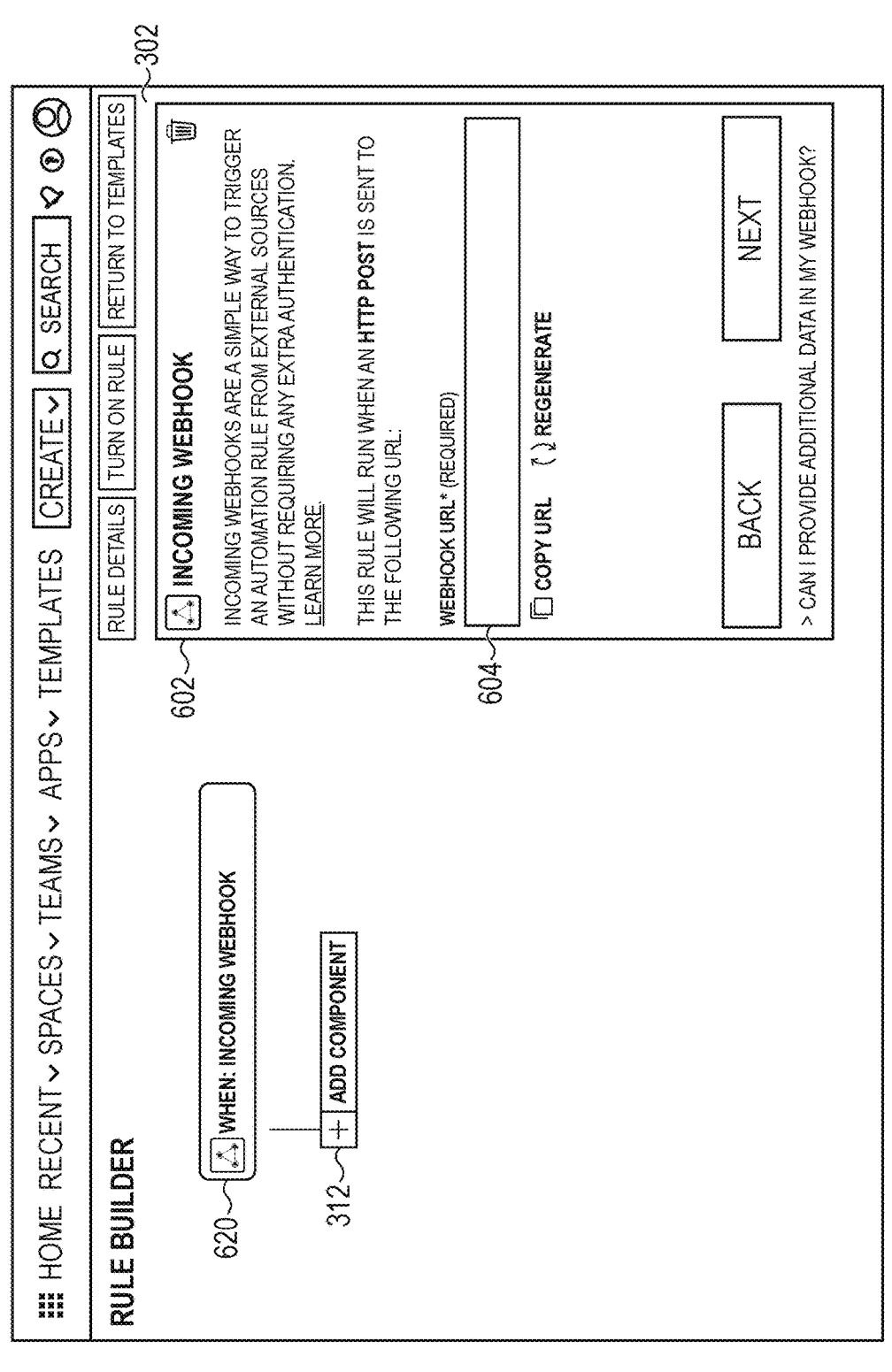
FIG. 6 depicts an example frontend interface that supports automation rule creation and automated content assessment for collaboration platforms.
Figure 7:
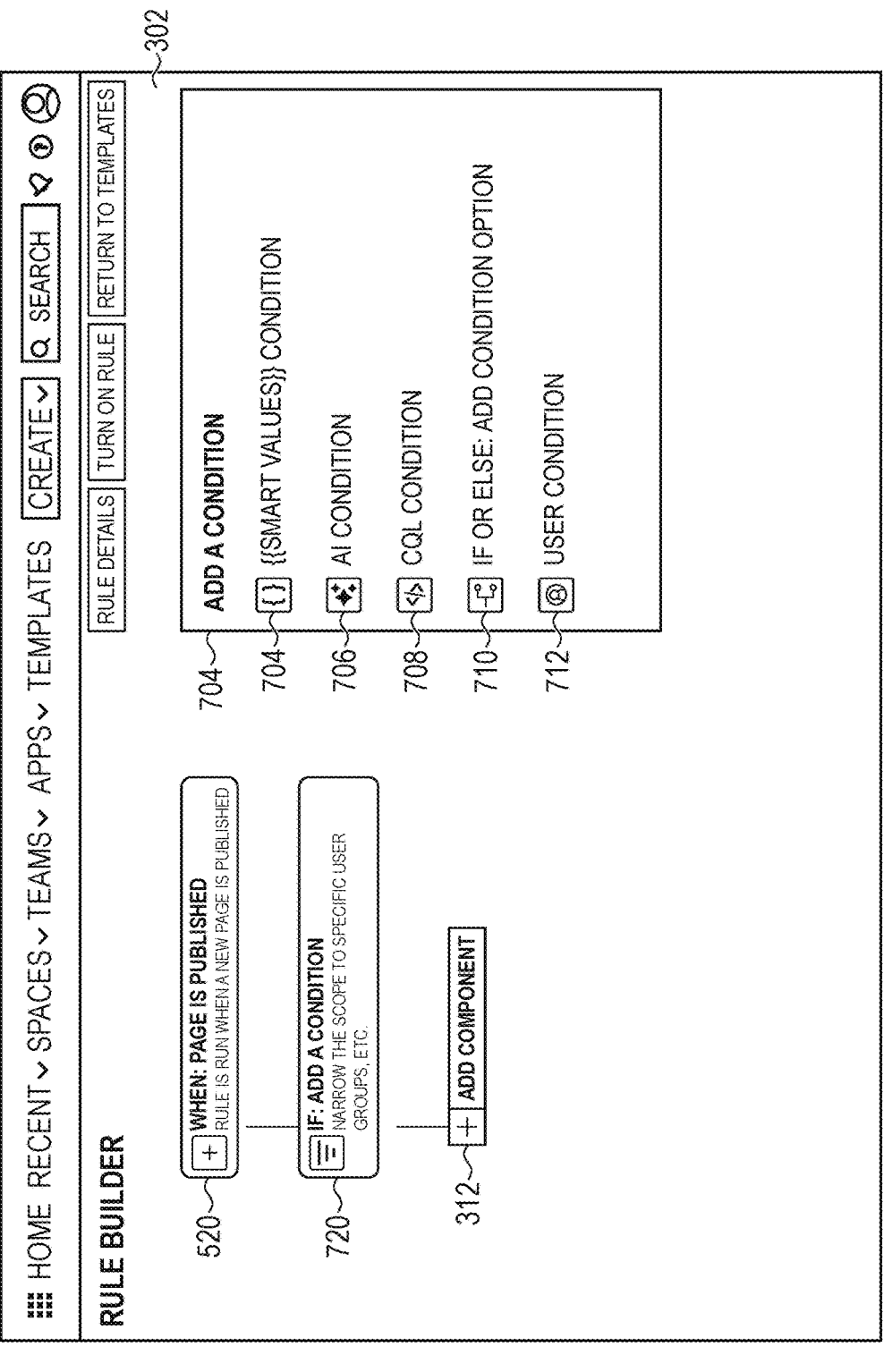
FIG. 7 depicts an example frontend interface that supports automation rule creation and automated content assessment for collaboration platforms.
Figure 8:
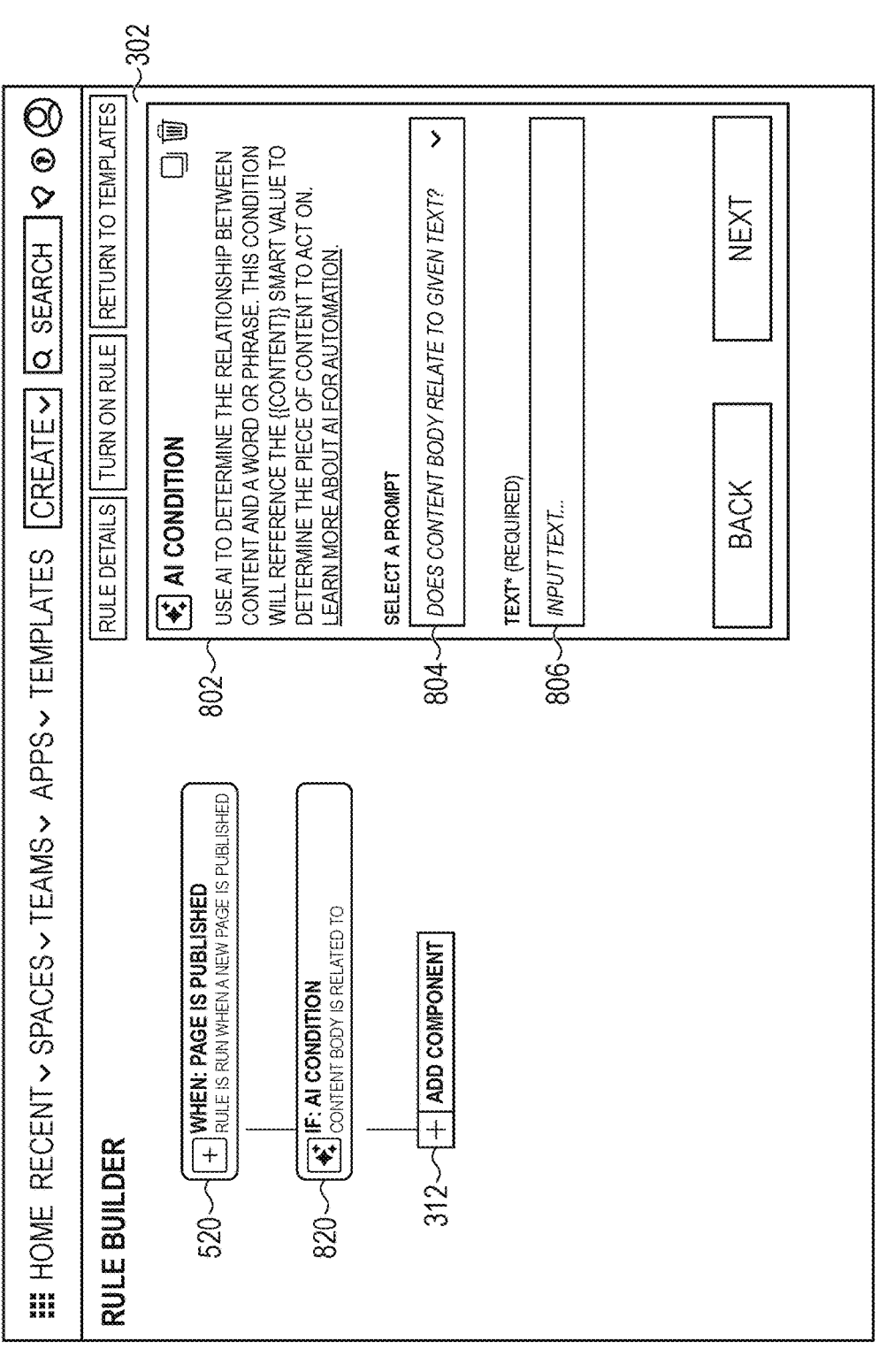
FIG. 8 depicts an example frontend interface that supports automation rule creation and automated content assessment for collaboration platforms.
Figure 9:
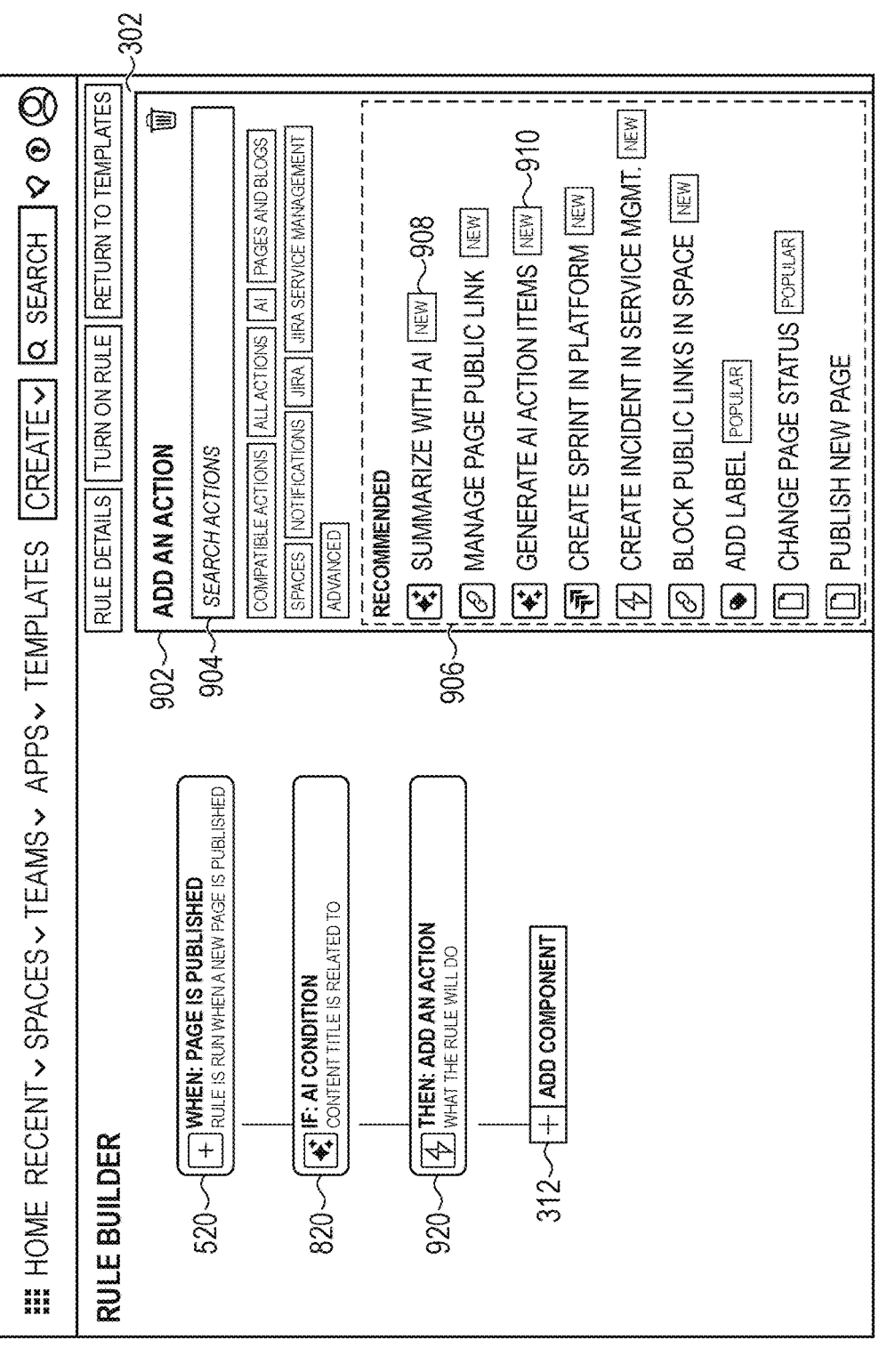
FIG. 9 depicts an example frontend interface that supports automation rule creation and automated content assessment for collaboration platforms.
Figure 10:
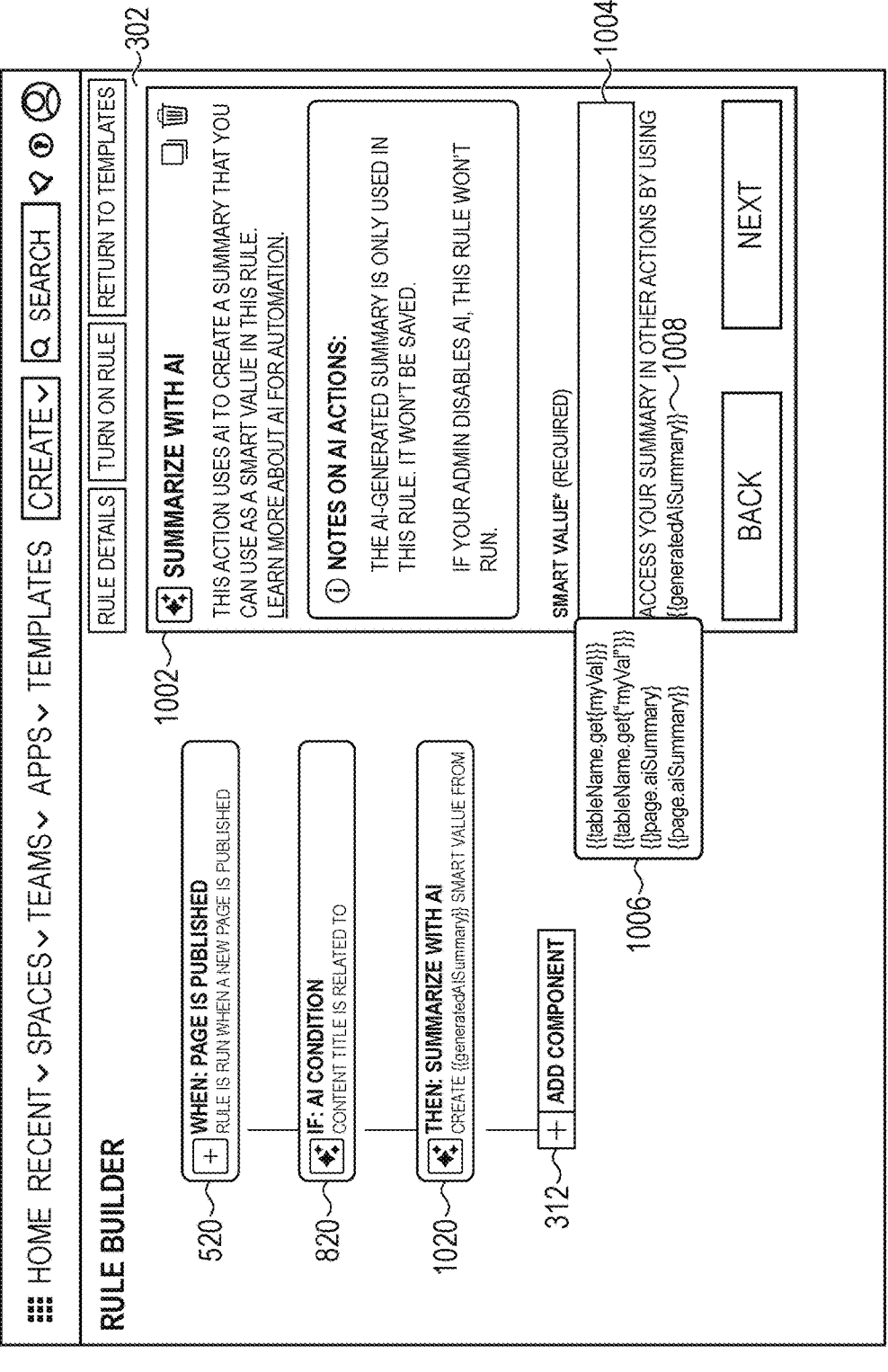
FIG. 10 depicts an example frontend interface that supports automation rule creation and automated content assessment for collaboration platforms.

FIGS. 3-10 generally depict frontend interfaces in an example of a flow to generate an automation rule. FIG. 3 generally depicts an interface that is used to generate an automation rule that includes conditions utilizing a generative output engine. FIG. 4 generally depicts an interface the selection of a trigger component for an automation rule flow. FIG. 5 generally depicts required and optional component categories for a user to select to display additional automation rule components to add to the automation rule flow, incorporating the previously-selected trigger component. FIG. 6 generally depicts an example of the trigger component being an incoming webhook. FIG. 7 generally depicts the selection of a condition component for an automation rule flow, incorporating a previously-selected trigger component, including a condition component that utilizes the generative output engine. FIG. 8 generally depicts the selection of specifics of a condition component that utilizes the generative output engine. FIG. 9 generally depicts the selection of an action component for an automation rule flow, incorporating the previously-selected trigger component, including one or more action components that utilize the generative output engine. FIG. 10 generally depicts the selection of specifics of an action component that utilizes the generative output engine.

FIG. 3 depicts an example frontend interface 300 that supports automation rule creation and automated content assessment for collaboration platforms, in accordance with aspects described herein. Frontend interface 300 may also be referred to as a UI or GUI. In one or more embodiments, frontend interface 300 may be displayed at a same display or interface as frontend interface 200, for example rendered in response to a user selecting the rule builder button 202. The frontend interface 300 displays the rule builder 302, which includes graphical elements to assist a user in generating an automation rule to operate in a collaboration system (e.g., system 100), as further described herein. In some embodiments, rule builder 302 may be at least a part of a GUI that is rendered by one of first platform backend 108 or second platform backend 110.

In one or more embodiments, rule builder 302 may include a proposed automation flow (or workflow) region and a control region.

Generally, the proposed automation flow region includes graphical elements representing automation rule components. In some examples, the graphical elements representing automation rule components may be replaced during rule building with graphical elements representing selected automation rule components. For example, the proposed automation flow region may include a trigger adding button that may be replaced by a graphical element representing a trigger component 322 that is selected. The trigger adding button may also generally be a component adding button. The proposed automation flow region may further include a condition adding button for a condition component 324, which may also generally be a component adding button. The proposed automation flow region may further include an action component 326, which may also generally be a component adding button.

As shown in the frontend interface 300, the condition component may be modified via a condition window 330 used to set, modify, or otherwise define characteristics of the condition component 324. Generally, the condition window 330 may be used to select an object via an object input field

334 to which the condition refers, and provide instructions via an instruction input field 336 for determining whether the condition is satisfied.

In some examples, the object input field 334 may refer back to the object referenced by the trigger component 322. That is, the same object whose state change triggered the automation may be the same object or portion of the object for object input field 334. For example, a page creation or modification may trigger the automation rule according to trigger component 322, and the object input field 334 may be the page or another content portion of the page, such as a page title or body. In another example, the object or portion of the object for object input field 334 may be different than an object for the trigger. For example, the object input field 334 may be a page (or other object), and the trigger for the trigger component 322 may be a manual trigger, a timer, a status change for a page, a publication or movement of the page, a creation of a task in an issue tracking system, an access or modification of source code in a source code management platform, or other object.

The instruction input field 336 may generally refer to parameters that may be used by the generative output engine to determine whether the condition of condition component 324 is satisfied. For example, instruction input field 336 may be an indication of text, such as a string, that is compared against object input field 334 by the generative output engine. For example, the object input field 334 may be a content portion of a page header in a documentation system. The instruction input field 336 may be text, such as a specific project name, "marketing," "sales," "team retreat," "code review," "positive, cheery sentiment," or any other subject, topic, or category, that is used by the generative output engine compared against the content portion of the page header to determine whether the condition is met or satisfied. Such indication may be generally referred to herein as a classifier, and may have an associated string (a classifier string).

It should be noted that the comparison performed by the generative output engine is generally not a text or word search within the object. That is, a prompt is generated for the generative output engine that includes a content portion from the object input field 334, an indication of the instruction input field 336 (e.g., one or more classifier strings), and a set of example input-output content to classifier pairs. The input-output content to classifier pairs may be examples of "correct" mappings of content (e.g., content portions) to classifier strings that are used for learning by (e.g., used to teach) the generative output engine. For example, the classifier may be related to a tone of the object, such as "positive and optimistic," in which case the pairs may include a set of text blocks that the generative output engine (via the prompt) is informed are considered to be "positive and optimistic." The generated prompt may be specific to the instructions selected via the instruction input field 336, the object input field 334, or both. That is, a prompt generated for a first classifier may have one set of example input-output content to classifier pairs, but a prompt generated for a different classifier may have a different set of example input-output content to classifier pairs. For example, for a "code review" classifier the set of pairs for the generated prompt is generally different from the set of pairs where the classifier is "upbeat tone."

In some embodiments, the condition window 330 may further include a template input field 332 that can be used to specify a template for the condition window 330. That is, the object input field 334 and the instruction input field 336 may operate differently or present different information depend-ing on input received at the template input field 332. For example, template input field 332 may be a pre-populated dropdown list, and the selection of a template from the list may be used to populate a dropdown of candidate objects for the object input field 334. For example, a template of the template input field 332 may be "page." Selection of the "page" template may result in two selectable objects in the object input field 334: a first selection corresponding to a content body of a page, and a second selection correspond-ing to a title of the page.

As used herein, an input field may generally be populated via a text entry, or be populated via a dropdown selection. In some cases, text may be suggested (e.g., auto-populated) as a user types. The suggestion may be context-specific. For example, the suggested text may be different for an AI condition (e.g., condition using a generative output engine) than for a Confluence Querying Language (CQL) condition. Similarly, the suggested text may be component-type spe-cific, for example different for a condition component than an action component.

In one or more embodiments, the object that triggered the trigger component 322 may be of a first platform (e.g., the first platform backend 108), and the object referenced by the condition component 324 may be of a second platform (e.g., the second platform backend 110). That is, the object ref-erenced by the object input field 334 may be of a different platform than the object that triggered the automation rule. For example, a trigger may be satisfied by a change of status of a ticket in an issue tracking system, and the condition may be satisfied by the existence of a document within a docu-mentation platform that relates to a positive product review as a classifier. In another example, a non-platform object may trigger the automation rule, and the object of the condition may be of one of the platforms (e.g., the first platform backend 108 or the second platform backend 110). Alternatively, in other embodiments, the object that trig-gered the automation rule may be of one of the platforms, while the object of the condition may be a non-platform object.

In some embodiments, the object referenced by the con-dition component 324 may be of a first platform (e.g., the first platform backend 108), and an object acted on accord-ing to the action component 326 may be of a second platform (e.g., the second platform backend 110). That is, the object referenced by the object input field 334 may be of a different platform than the object acted on or created as a result of the condition being met. For example, the condition may be met by a page of a documentation platform being created whose body or title relates to financial budgeting at a classifier. The object acted upon by the action component 326 may be the creation or modification of a ticket within an issue tracking system. In another example, a non-platform condition may be satisfied according to the automation rule, and the object of the action performed as a result of the condition being satisfied may be a non-platform object. Alternatively, in other embodiments, the object evaluated for the condition may be a non-platform object, while the object of the condition may be of one of the platforms (e.g., the first platform backend 108 or the second platform backend 110).

In some embodiments, user permissions may be evaluated when an automation rule operates across platforms, or between one of the platforms and a non-platform system. That is, as part of running an automation rule that starts, is initiated, or otherwise triggered in a first platform, one or more conditions or actions may use a second platform as described herein. In such cases, the process of performing the automation may further include verifying or checking the credentials (permissions) of a user with the second platform. In other embodiments, access may be granted or denied based on a user role. Where an automation rule has been created (e.g., established as a service), if the user does not have sufficient permissions to access an object of the second platform, then the automation rule may cease to run or fail. In one or more embodiments, an error message or other indicator may be provided to the user or logged to indicate the failure to run the automation rule by reason of a lack of permissions. In some embodiments, where one or more components of the automation rule require checking permissions to access an object of a platform (e.g., the second platform or a non-platform system referenced by the automation rule), a GUI may be displayed to a user for the user to enter the user's credentials associated with that platform. The entered credentials may then be provided to the platform to allow the automation rule to continue to run.

In one example, an action (e.g., an action using the generative output engine), may be used to update a parent page in a hierarchy of pages. For example, if a user creates a page in a particular group of pages, a summary or other parent page may be created or updated with information from the newly created child page. For example, the parent page may include a summary and/or action items generated by the content generation engine. Upon creation of a new child page (e.g., in a designated group or set of pages), the content generation engine may be used to update the parent summary and/or the action items. A prompt may be generated with instructions and/or a template, the old parent page, the new child page, and sample input-outputs, and a new parent page returned by the generative output engine. Alternatively, the prompt may be generated with instructions and/or a template, the old child paged, the new child page, and sample input-outputs, and a new parent page returned by the generative output engine that can replace the old parent page.

FIG. 4 depicts an example frontend interface 400 that supports automation rule creation and automated content assessment for collaboration platforms, in accordance with aspects described herein. Frontend interface 400 may also be referred to as a UI or GUI. In one or more embodiments, frontend interface 400 may be displayed at a same display or interface as frontend interface 200 or frontend interface 300, for example rendered in response to a user selecting the rule builder button 202. The frontend interface 400 displays the rule builder 302, which includes graphical elements to assist a user in generating an automation rule to operate in a collaboration system (e.g., system 100), as further described herein. In some embodiments, rule builder 302 may be at least a part of a GUI that is rendered by one of first platform backend 108 or second platform backend 110.

In one or more embodiments, rule builder 302 may include a proposed automation flow (or workflow) region and a control region.

Generally, the proposed automation flow region includes graphical elements representing automation rule components. In some examples, the graphical elements representing automation rule components may be replaced during rule building with graphical elements representing selected automation rule components. For example, the proposed automation flow region may include a trigger adding button 410 that may be replaced by a graphical element representing a selected trigger component, and a component adding button 412 that may be replaced by a selected action component. The proposed automation flow region may expand or contract as automation rule components (and their respective graphical elements) are added or deleted.

Generally, the control region may include a search box for automation rule components, tabs for categories of those automation rule components, and graphical elements representing selectable automation rule components.

In one or more embodiments, the rule builder 302 of the frontend interface 400 may include a search box 404, a set of tabs 406, and a set of trigger components 408 in the control region, and a trigger adding button 410 and a component adding button 412 in the automation workflow region. Frontend interface 400 illustrates a simplified view. In some embodiments, rule builder 302 may be embedded within another GUI (e.g., window), or include one or more additional textual and/or graphical elements not shown with reference to frontend interface 400.

The search box 404, the set of tabs 406, and the set of trigger components 408 may be rendered and displayed to a user, for example responsive to the user initiating (starting, entering) the rule builder 302 and selecting the graphical element that is the trigger adding button 410. In some embodiments, after selecting a trigger component for an automation rule, a user may select the graphical element that is the add a component, button 412. In other embodiments, a user may select the graphical element that is the add a button 412 before selecting the trigger component.

The set of trigger components 408 includes trigger components that may be used to initiate an automation rule based on an event. In some embodiments, the triggers may be organized into one or more groups or subsets of triggers components. In the example of the frontend interface 400, the groups include recommended, pages and blogs, tasks, spaces, scheduled, and integrations. In this example, the recommended triggers include a manual trigger from a page, a page moved, a page published, or a page status changed, for example page published trigger 420. The pages and blogs triggers include a manual trigger from a page, at attachment added to a blogpost, an attachment added to a page, at attachment deleted from a blogpost, an attachment deleted from a page, a blog commented, a blog labeled, a blog published, a page archived, a page comments, a page copied, a page deleted, a page edited, a page labeled, a page moved, a page owner changed, a page published, a page status changed, or a user mentioned. The tasks triggers include task created and task status changed. The spaces triggers include space archived, space created, or space deleted. The scheduled triggers include a scheduled trigger. The integrations triggers include an incoming webhook trigger, for example incoming webhook trigger 422.

In one or more embodiments, the recommended triggers of the set of trigger components 408 may be based on a usage history for the user, such as the quantity of uses for the trigger component exceeding a threshold value or the user's most used trigger components (e.g., ten most used trigger components). In other embodiments, the recommended triggers are based on the quantity of uses by a group of users (e.g., of the platform, or accessing a centralized automation rule service 112), and may include the most used trigger components or the trigger components whose usage has exceeded a threshold value. In some cases, the recommended triggers may be a curated list within a platform or the centralized automation rule service 112, and may depend on which platform a user is accessing. In some embodiments, the generative output service 116 may be trained on the usage of trigger components for automation rules within a platform or set of platforms, and be used to determine the recommended trigger components based on one or more inputs and a list of potential or candidate trigger components. In some examples, the generative output service 116 can receive (e.g., from the centralized automation rule service 112) information regarding a history of trigger component selections (e.g., for a particular user, group of users, particular platform, or by other groupings), and this information used by the generative output service 116 to provide (e.g., from the centralized automation rule service 112) an indication (e.g., suggestion or recommendation) for a trigger component or set of trigger components 408 (e.g., as the "recommended" trigger components) as part of automation rule building and creation.

The trigger groups for the set of trigger components 408 may be selectable via the set of tabs 406. For example, by selecting the "tasks" selectable element, the set of trigger components 408 may be pared down to display only the associated task triggers 414 (e.g., task created and task status changed), and the other available trigger components hidden.

Search box 404 accepts textual inputs from a user, and in response, the rule builder 302 can filter the set of trigger components 408. In some embodiments, the displayed set of trigger components 408 may be pared down such that only trigger components that satisfy the search are displayed (and other, non-responsive trigger components hidden). In other embodiments, a drop-down or pop-up may be displayed that includes selectable trigger components that satisfy the search.

In some embodiments, trigger components may include one or more of a field value changed, form submitted, incoming webhook, issue assigned, issue commented, issue comment edited, issue created, issue deleted, issue linked, issue link deleted, issue moved, issue transitioned, issue updated, a manual trigger from an issue, a combination of issues, when work is logged, a sprint is created, started, or completed, a version is created, updated, or released, a branch created, build failed, build status changed, build successful, commit created, deployment failed, deployment status changed, deployment successful, pull request create, pull request, declined, pull request merged, vulnerability found, object triggered, service limit breach, a service legal agreement threshold breached, approval required, approval completed, or an emoji reaction to application message. In some embodiments, these example triggers are intended for use with reference to the context of an issue tracking platform.

Additionally, or alternatively, trigger components may include one or more of a page archived, page commented, page copied, page deleted, page edited, page labeled, page moved, page owner changed, page published, page status changed, attachment added to page, attachment deleted from page, attachment deleted from page, manual trigger from page, task created, task status changed, blog commented, blog labeled, blog published, attachment added to blog, attachment deleted from blog, user mentioned, space archived, space created, or a combination of these. In some embodiments, these example triggers are intended for use with reference to the context of a documentation platform.

FIG. 5 depicts an example frontend interface 500 that supports automation rule creation and automated content assessment for collaboration platforms, in accordance with aspects described herein. Frontend interface 500 may be an example of frontend interface 200, frontend interface 300, or frontend interface 400 following selection by a user of a page published trigger component, for example page published trigger 420. Following selection, the page published trigger 520 may be shown as part of the automation rule flow.

In one or more embodiments, rule builder 302 of the frontend interface 500 may include a component addition box 502 that indicates required and optional components for an automation rules. In particular, in addition to a trigger component, an automation rule requires at least one action component. Action components are automation rule components that will execute if the automation rule runs successfully (e.g., based on a detected triggering event). As such, a selectable graphical element for an action component 504 is displayed. Upon selection (e.g., via point click or double-click, or drag and drop to the add component graphical element, such as button 512), action components may be displayed in the rule builder 302 as further discussed herein.

An automation rule may use one or more additional components, such as conditions or branch components, including one or more condition components that utilize a generative output engine as further described herein. As such, component addition box 502 may also include selectable graphical elements for a condition component 506 and a branch component 508.

Condition components are automation rule components that limit the scope of the automation rule to specific user groups or keyworks. For example, a condition may limit a rule to run on a specific path, depending on which condition is met (satisfied). In one or more embodiments, there is a single event condition. In other embodiments, multiple event conditions are used, and may be set to occur at any point within the automation rule chain. In some embodiments, event condition(s) are in if-then or if-then-else form. In one or more embodiments, examples of event conditions include a user, a database query (e.g., a CQL), such as a query in the form of an "if" statement for a content of a page, blog, comment, or attachment, a compare, an if-else statement, or a combination of these. In some embodiments, these conditions are for a documentation platform.

In one or more embodiments, examples of event condition(s) include compare functions, which may be values or regular expressions. In one or more embodiments, values for a compare function may include one or more of an issue, conditional logic, users, test fields, date and time, JavaScript Object Notation (JSON) function, math expression, list, or a combination of these. In some embodiments, these conditions are for an issue tracking platform.

Branch components are automation rule components that apply actions and conditions within each branch to each task, each page, and so on. In some embodiments, a branch component is similar to a "for each" requirement.

According to the example shown for frontend interface 500, the trigger component is a page published trigger 520. In other embodiments, other triggers, including other example trigger components described herein or any other suitable trigger component for an automation rule, may be used consistent with a condition component that uses a generative output engine, as further described herein.

FIG. 6 depicts another example frontend interface 600 that supports automation rule creation and automated content assessment for collaboration platforms, in accordance with aspects described herein. Frontend interface 600 may be an example of frontend interface 200, frontend interface 300, or frontend interface 400 following selection by a user of an incoming webhook trigger component, for example incoming webhook trigger 422. Following selection, the incoming webhook trigger 620 may be shown as part of the automation rule flow.

For the incoming webhook trigger 620, a component specification window 602 may be displayed, for example when a user selects to include the incoming webhook trigger

620 in the automation rule, or upon selection of the incoming webhook trigger 620 during modification or editing of the automation rule flow. The component specification window 602 includes an input field 604 for the input of a universal resource locator (URL) for the webhook. Webhooks are generally automated messages sent from applications when something happens at that application. The webhook may have a payload that is sent to the URL of the webhook, thus acting as a triggering event for the automation rule that uses an incoming webhook trigger 620.

FIG. 7 depicts an example frontend interface 700 that supports automation rule creation and automated content assessment for collaboration platforms, in accordance with aspects described herein. Frontend interface 700 may be an example of frontend interface 500 or frontend interface 600 following selection by a user of a generic condition component 720. Following selection, the generic condition component 720 may be shown as part of the automation rule flow, and a condition selection window 702 displayed adjacent the automation rule flow in the rule builder 302.

The condition selection window 702 presents condition components that are available to be added to the automation rule. In one or more embodiments, one or more condition components may include condition components that utilize a generative output engine. For example, the AI condition 706 may be selectable to provide a condition component using the generative output engine. Examples of other condition components include a smart values condition 704, a CQL condition 708, an if-or-else condition 710, and a user condition 712.

FIG. 8 depicts an example frontend interface 800 that supports automation rule creation and automated content assessment for collaboration platforms, in accordance with aspects described herein. Frontend interface 800 may be an example of frontend interface 500, frontend interface 600, or frontend interface 700 following selection by a user of a condition component that utilizes a generative output engine, for example AI condition 706. Following selection, the condition component 820 may be shown as part of the automation rule flow.

For the condition component 820, a component specification window 802 may be displayed, for example when a user selects to include the condition component 820 in the automation rule, or upon selection of the condition component 820 during modification or editing of the automation rule flow. In one or more embodiments, the component specification window 802 includes an input field 804 for the input (or selection from a list) of a prompt for the condition component 820, and an input field 806 for the input (or selection from a list) of a classifier string. In some examples, the input field 804 is an example of the template input field 332, and the input field 806 is an example of the instruction input field 336, further discussed herein with reference to the frontend interface 300.

FIG. 9 depicts an example frontend interface 900 that supports automation rule creation and automated content assessment for collaboration platforms, in accordance with aspects described herein. Frontend interface 900 may be an example of frontend interface 700 or frontend interface 800 following selection by a user of a generic action component 920. Following selection, the generic action component 920 may be shown as part of the automation rule flow, and a condition selection window 902 displayed adjacent the automation rule flow in the rule builder 302.

The condition selection window 902 present a set of action components 906 that are available to be added to the automation rule. A search input field 904 may be used to search for and identify action components from the set of action components 906. In one or more embodiments, one or more action components may include action components that utilize a generative output engine. For example, the summarize with AI action 908 may be selectable to provide an action component that utilizes the generative output engine to provide a summary of a content portion of an object. In another example, the generated AI action items action 910 may be selectable to provide an action component that utilizes the generative output engine to generate a list of action items from a content portion of an object. Examples of other condition components of the set of action components 906 include a manage page public link action, a create sprint in platform action, a create incident in service management action, a block public links in space action, an add label action, a change page status action, and a publish new page action.

Generally, each action component of the set of action components 906 indicates the action to be performed following the trigger component 52 and satisfaction of the condition component 820. The action indicates the object on which the action is performed. Actions are what the automation rule is to do or, stated differently, what happens if the automation rule executes successfully.

In some embodiments, the set of action components 906 may be organized into one or more groups or subsets of action components. For example, the groups may include recommended pages and blogs, spaces, notifications, Jira (e.g., an example of issue tracking system), and advanced. In this example, the recommended actions include a transition an issue in Jira, edit an issue in Jira, add a label, change page status, create issue in Jira, publish a new page, restrict a page, or send an email. The pages and blogs actions include adding a comment, adding a label, archiving a page, change a page owner, change a page status, copy a page, delete a blog, delete a page, manage watchers, move a page, publish a new page, remove a label, or restrict a page. The spaces actions include archiving a space, creating a space, or granting space permissions. The notifications actions include sending an email, sending a message through a first platform (e.g., a Microsoft Teams message), sending a message through a second platform (e.g., a Slack message), sending a message through a third platform (e.g., a Twilio notification), or send a web request. The Jira actions include transitioning an issue, editing an issue, or creating an issue. The advance actions include creating a lookup table, creating a variable, or logging an action.

The action groups for the set of action components 906 may be selectable via a set of tabs. For example, by selecting the "spaces" selectable element, the set of action components 906 may be pared down to display only the associated spaces actions (e.g., archive space, create space, and grant space permission), and the other available action components hidden.

Search input field 904 (e.g., a search box) accepts textual inputs from a user, and in response, the rule builder 302 can filter the set of action components 906. In some embodiments, the displayed set of action components 906 may be pared down such that only action components that satisfy the search are displayed (and other, non-responsive action components are hidden). In other embodiments, a drop-down or pop-up may be displayed that includes selectable trigger components that satisfy the search.

In one or more embodiments, actions of the set of action components 906 include one or more of page archiving, page ownership changing, page status changing, page copying, page deletion, page moving, new page publishing, page restriction, blog deletion, comment addition, label addition, label removing, watcher management, space permission adding, space archiving, or a combination of these. In some embodiments, these actions are for a documentation platform.

In one or more embodiments, actions of the set of action components 906 include one or more of email sending, application message sending, text message sending, web request sending, variable creation, action logging, or a combination of these. In some embodiments, these actions are for an issue tracking platform.

FIG. 10 depicts an example frontend interface 1000 that supports automation rule creation and automated content assessment for collaboration platforms, in accordance with aspects described herein. Frontend interface 1000 may be an example of frontend interface 700, frontend interface 800, or frontend interface 900 following selection by a user of a condition component that utilizes a generative output engine, for example summarize with AI action 1020. Following selection, the summarize with AI action 1020 may be shown as part of the automation rule flow.

For the summarize with AI action 1020, a component specification window 1002 may be displayed, for example when a user selects to include the summarize with AI action 1020 in the automation rule, or upon selection of the summarize with AI action 1020 during modification or editing of the automation rule flow. In one or more embodiments, the summarize with AI action 1020 may be used to create a summary that can then be used as a dynamic text reference 1008 (e.g., "{{generatedAISummary}}") that may be accessed and used by other actions of the automation rule. For example, a next component may be an action component to send an email, create a page, or update an existing page, and the action component may use the dynamic text reference 1008 (e.g., "{{generatedAISummary}}") to incorporate or otherwise utilize the generated summary.

In one or more embodiments, the component specification window 1002 includes an input field 1004 for a text input, such as a dynamic text reference (which may also be referred to as a "smart value"). In some examples, a set of dynamic text references 1006 may be selectable by a user when specifying parameters in the component specification window 1002. Examples of dynamic text references 1006 include references to values within a table (e.g., "{{tableName.get{myVal}}}") or an AI-generated summary of a page (e.g., "{{page.aiSummary}}").

Figure 11:
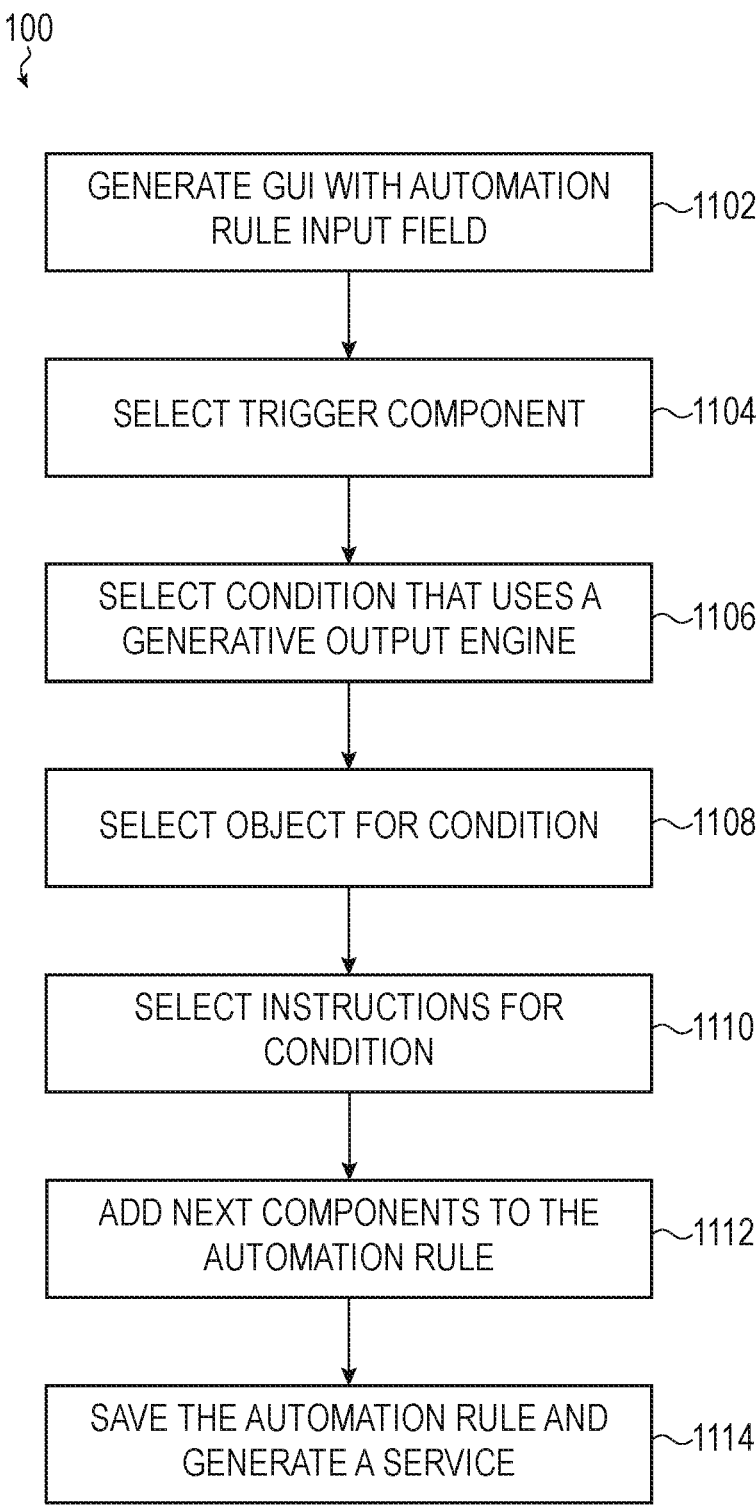
FIG. 11 depicts an example method of automation rule creation.

FIG. 11 shows an example method 1100 of automation rule creation, for example in collaboration platforms, according to one or more aspects described herein. In one or more embodiments, method 1100 supports one or more aspects of automation rule creation, as further described herein, for example with reference to any one or more of FIGS. 1-10. The method 1100 may be performed using a processor and/or memory, or other components of the content collaboration system.

At 1102, the method 1100 includes generating a GUI with an automation rule input field. In one or more embodiments, the method 1100 includes causing generation of a GUI of the collaboration system, the GUI including a first input field for receiving user input.

At 1104, the method 1100 includes selecting a trigger component. In one or more embodiments, the method 1100 includes, in response to receiving a first input of the GUI, indicating a selection of a trigger component for an automation rule. In one or more embodiments, the trigger component is associated with a change to an object of the collaboration system. The method 1100 may further include causing generation of a first one or more graphical elements representing the selected trigger component.

At 1106, the method 1100 includes selecting a condition for the automation rule that uses a generative output engine. In one or more embodiments, the method 1100 includes causing generation of a second one or more graphical elements representing a set of candidate condition components for the automation rule. The method 1100 may then further include selecting a condition component of the set of candidate condition components that uses the generative output engine.

At 1108, the method 1100 includes selecting an object for the condition. In some embodiments, selecting the object may be identifying a prompt type for the condition. In one or more embodiments, the method 1100 includes, in response to receiving a selection of a condition component, causing generation of a second input field for receiving user input indicating, for the condition component, a content portion of the object of the collaboration system. In some embodiments, in response to receiving a second input to the GUI indicating the content portion, the method may include causing generation of a third one or more graphical elements representing the condition component.

At 1110, the method 1100 includes selecting instructions for the condition. In one or more embodiments, selecting the instruction may be receiving input indicating one or more classifier strings for the content portion a prompt type for the condition. In one or more embodiments, the method 1100 includes, in response to receiving a selection of a condition component, causing generation of a third input field for receiving user input indicating one or more classifier strings for the content portion. In some embodiments, in response to receiving a third input to the GUI indicating the one or more classifier strings, the method may include causing generation of a fourth one or more graphical elements representing a set of next components for the automation rule.

At 1112, the method 1100 includes adding one or more next components to the automation rule. In one or more embodiments, the one or more next components include one or more actions, conditions, or branches. In one or more embodiments, the method 1100 includes, receiving input identifying a selection of the one or more next components from a set of next components.

At 1114, the method 1100 includes saving the automation rule and generating a service. In one or more embodiments, the method 1100 includes, in response to receiving a fourth input of the GUI indicating for the collaboration system to save the automation rule that includes the trigger component, the condition component that uses the generative output engine, and the one or more next components. The method further includes, in response to receiving the fourth input, generating a service on the collaboration system that obtains, for the condition component, a first generative response from the generative output engine in response to an event satisfying the trigger component. The service can additionally perform an operation in response to a condition satisfying the condition component, wherein the operation corresponds to the one or more next components.

In some embodiments, the object of the collaboration system includes a page of a documentation platform. The content portion of the object of the collaboration system may include a body of the page or a title of the page. In some embodiments, the one or more classifier strings relate to the body or the title.

The method 1100 may be variously embodied, extended, or adapted, as described in the following paragraphs and elsewhere in this description.

Figure 12:
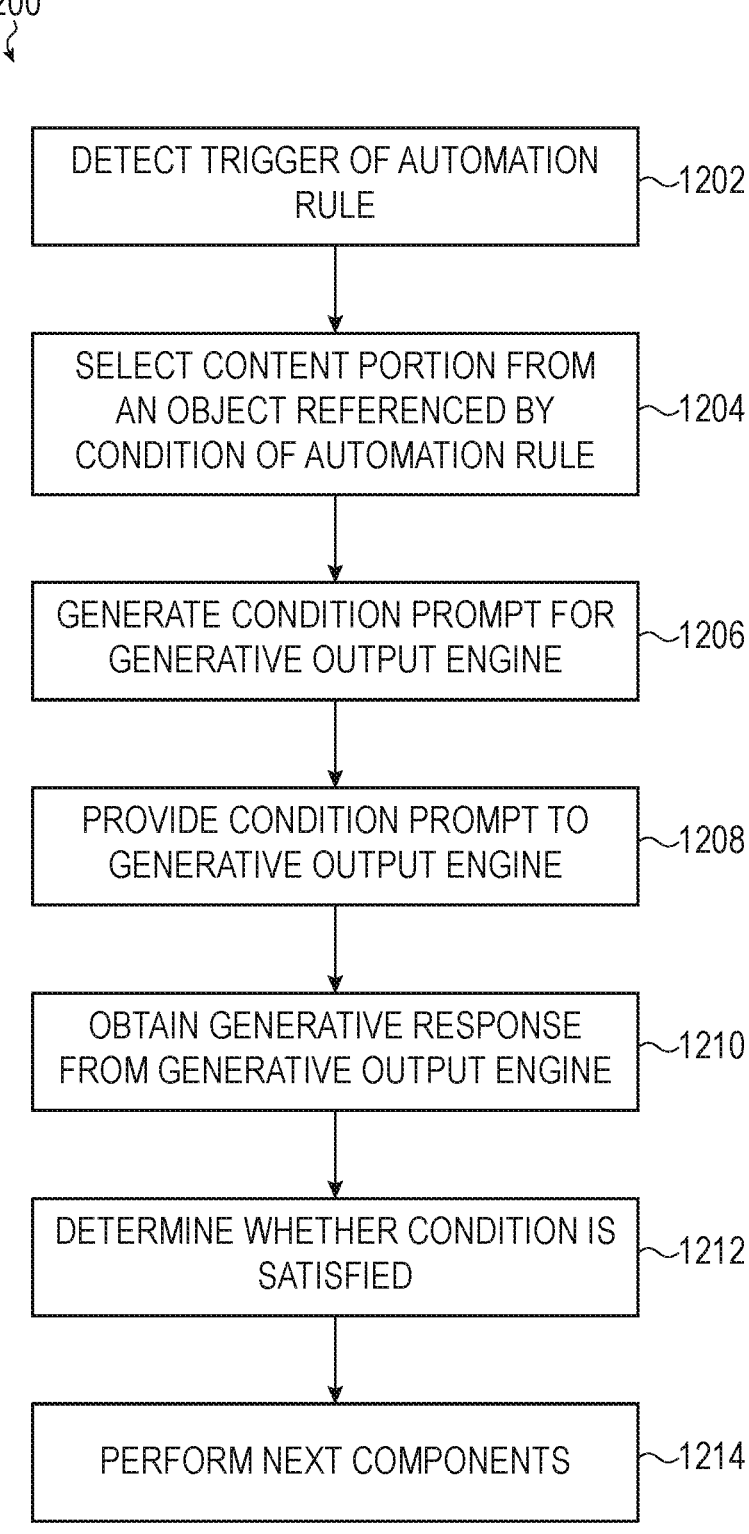
FIG. 12 depicts an example method of automated content assessment.

FIG. 12 shows an example method 1200 for automated content assessment within a collaboration system, for example in collaboration platforms, according to one or more aspects described herein. In one or more embodiments, method 1200 supports one or more aspects of automation rule creation, as further described herein, for example with reference to any one or more of FIGS. 1-10. The method 1200 may be performed using a processor and/or memory, or other components of the content collaboration system.

At 1202, the method 1200 includes detecting the trigger of an automation rule. In one or more embodiments, the method 1200 includes, in response to detecting that an object associated with a page of a documentation platform has been created or modified by a user, evaluating a criteria of a trigger component of an automation rule to determine that the criteria is satisfied by the object being created or modified.

At 1204, the method 1200 includes selecting a content portion from the object referenced by condition (condition component) of an automation rule. In one or more embodiments, the method 1200 includes, in response to determining that the trigger component is satisfied, selecting, according to a condition component of the automation rule, a content portion from the object associated with the page, the object referenced by the condition component.

At 1206, the method 1200 includes generating a condition prompt for a generative output engine. In one or more embodiments, the method 1200 includes generating a condition prompt comprising the content portion (e.g., a text string), one or more classifier strings for the content portion, and a set of example input-output content to classifier pairs.

At 1208, the method 1200 includes providing the condition prompt to the generative output engine. In one or more embodiments, the method 1200 includes providing the condition prompt to a generative output engine using a first application program interface call.

At 1210, the method 1200 includes obtaining the generative response. In one or more embodiments, the method 1200 includes obtaining a first generative response from the generative output engine responsive to the first application program interface call.

At 1212, the method 1200 includes determining whether the condition (condition component) is satisfied. In one or more embodiments, the method 1200 includes determining that the condition component of the automation rule is satisfied based on the first generative response.

At 1214, the method 1200 includes performing one or more next components of the automation rule. In one or more embodiments, the method 1200 includes in response to determining that the condition component is satisfied, performing one or more next components of the automation rule.

In one or more embodiments, the method 1200 further includes, in response to determining that the condition component is satisfied, selecting, according to an action component of the automation rule, the content portion from the object. In one or more embodiments, the method may further include generating an action prompt comprising the content portion and an indication of an output format for a second generative response. The method may further include providing the action prompt to the generative output engine using a second application program interface call, and obtaining the second generative response from the generative output engine responsive to the second application program interface call. The method may then further include creating or modifying content of the documentation platform using the second generative response.

In some embodiments wherein determining the content portion referenced by the condition component includes determining a referenced object based at least in part on a dynamic text reference of the automation rule, and selecting the content portion from the referenced object.

In some embodiments, the documentation platform includes a first platform of the collaboration system, and the referenced object is associated with content of a second platform of the collaboration system different from the first platform.

In some embodiments, the indication of the output format for the second generative response includes an indication to summarize the content portion. The action prompt may further include a set of example input-output content to summary pairs. The second generative response may include a summary of the content portion. In some embodiments, creating or modifying content of the collaboration system using the second generative response includes sending an email that includes the summary of the content portion.

In some embodiments, the indication of the output format for the second generative response includes an indication to provide a list of action items derived from the content portion. The action prompt may further include a set of example input-output content to list of action item pairs. The second generative response may further include the list of action items derived from the content portion. In some embodiments, creating or modifying content of the collaboration system using the second generative response includes sending an email comprising the list of action items.

In some embodiments, the indication of the output format for the second generative response includes an indication to provide a translation of the content portion. The second generative response includes the translation of the content portion, and the object includes a first object. In one or more embodiments, the method 1200 further includes creating a second object associated with the page of the collaboration system. The page may include the translation of the content portion.

In some embodiments, the content has been modified by the user, and the first generative response includes an indication that a modification of the content is complete. In some embodiments, performing the one or more next components includes sending an email to the user indicating for the user to verify that the modification of the content is complete. The method may further include, in response to the email to the user, receiving an indication that the user has verified the modification of the content being complete. The method may further include, in response to the receiving the indication, associating a marker with the object associated with the content, the marker indicating that the modification of the content is complete.

In some embodiments, the content has been modified by the user, and the first generative response includes an indication that a modification of the content is complete. In some embodiments, performing the one or more next components includes associating a marker with the object associated with the content. The marker may indicate that the modification of the content is complete. In method may further include sending an email to the user indicating for the user to confirm that the modification of the content is complete.

In some embodiments, the content portion comprises a body of the page or a title of the page.

The method 1200 may be variously embodied, extended, or adapted, as described in the following paragraphs and elsewhere in this description.

Figure 13:
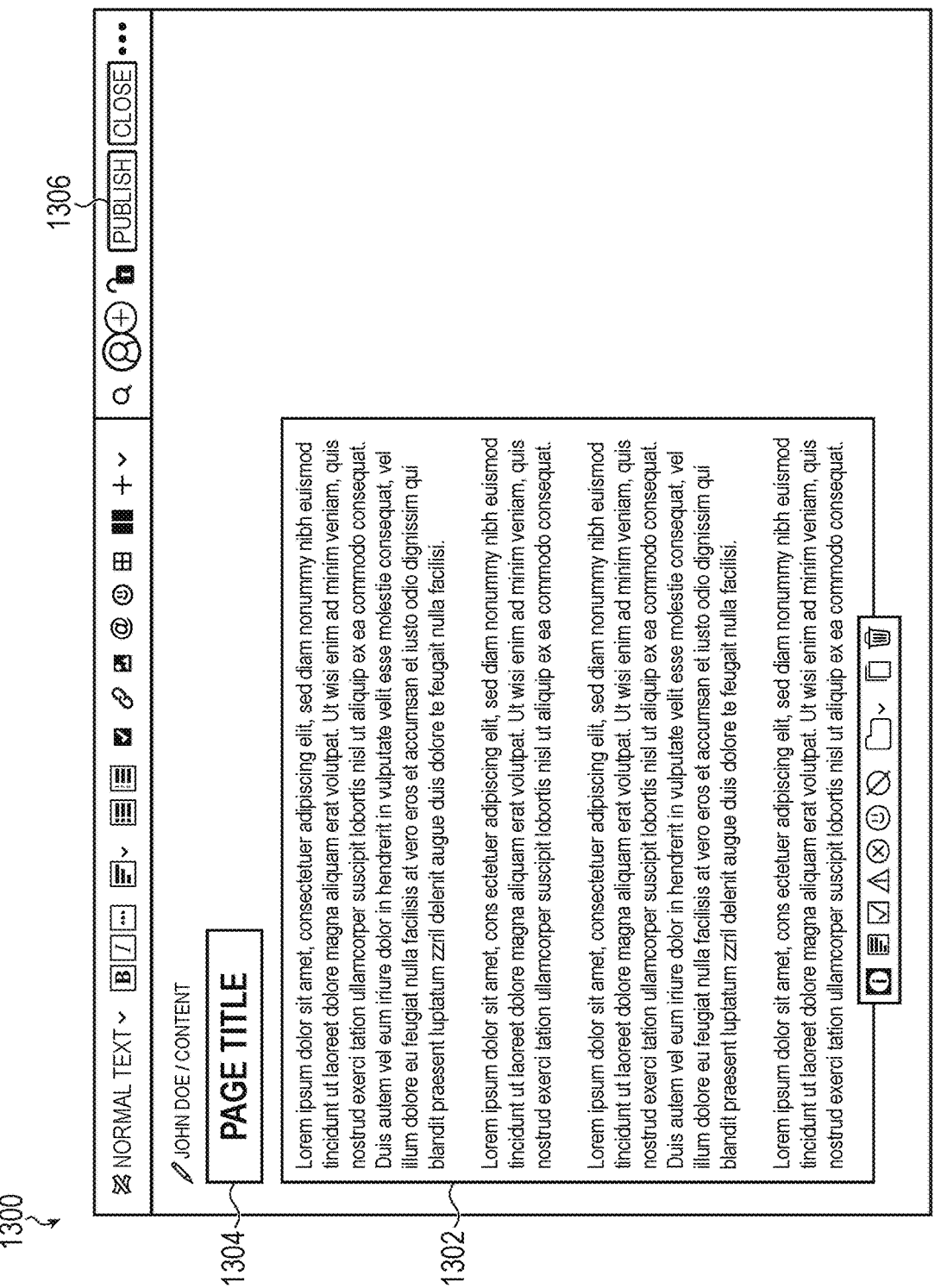
FIG. 13 depicts an example frontend interface that supports automated content assessment for collaboration platforms.

FIG. 13 depicts an example frontend interface 1300, in accordance with aspects described herein. Frontend interface 1300 may be an example of frontend interface that can trigger the performance of an automation rule that uses a condition component that utilizes a generative output engine as further described herein.

Frontend interface 1300 is an example of a frontend interface of a documentation platform. As illustrated for content window 1302 of the user interface receives a user input, which may be a content portion, which may include text, markup content, dynamic text references, links, icons, images, or a combination of these. A user may have also provided a title 1304 for a page to be generated with the content portion. A user may select a publish button 1306 to generate a page with the title 1304 and content portion from the content window 1302. In response, an object may be created in the document platform for the created page, and including the content portion.

In one or more embodiments, an automation rule may have previously been generated that has a trigger component that is satisfied based on the creation or modification of a page. In response, the automation rule may evaluate a condition that utilizes a generative output engine. For example, the condition may have as an object of the condition the object that triggered the automation rule. A condition prompt may be generated for the condition component, the prompt including the content portion, one or more classifier strings for the content portion, and a set of example input-output content to classifier pairs. The condition prompt may be provided to the generative output engine, which acts on (e.g., evaluates) the condition prompt and returns a generative response. Based on the generative response, the system (e.g., documentation platform) may determine that the condition component has been satisfied, and proceed to perform one or more next components (e.g., action component(s) and/or additional condition components).

In some examples, the next components may include one or more action components that use a generative output engine. For example, one action component may use a generative output engine to generate key points based on the content portion from the content window 1302. A second action component may use a generative output engine to generate action items based on the content portion from the content window 1302. A third action component may use a generative output engine to generate a summary based on the content portion from the content window 1302.

Figure 14:
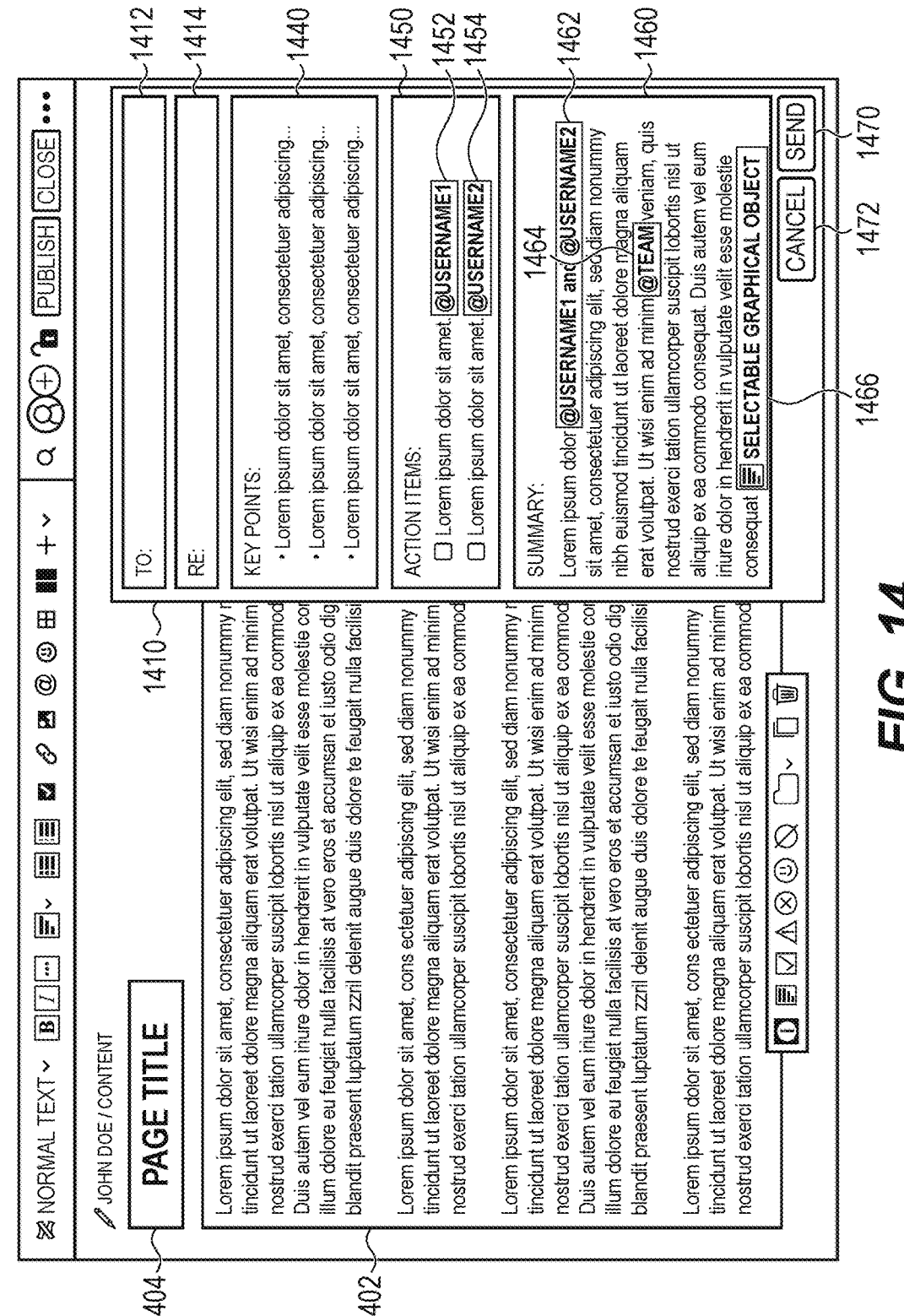
FIG. 14 depicts an example frontend interface that supports automated content assessment for collaboration platforms.

FIG. 14 depicts an example frontend interface 1400, in accordance with aspects described herein. Frontend interface 1400 may be an example of a frontend interface that results from an automation rule that uses a condition component that is triggered and run as described with reference to FIG. 13.

For example, frontend interface 1400 depicts a draft message (e.g., an internal message of a messaging platform, an email, etc.) that results from an automation rule that uses a condition component that is triggered and run as described with reference to FIG. 13. In particular, the draft email includes a to field 1412, a message title 1414 e.g., which may include the page title 1404, key points 1440, action items 1450, and summary 1460.

In some examples, one action component may use a generative output engine to generate key points 1440 based on the content portion from the content window 1402. A second action component may use a generative output engine to generate action items 1450 based on the content portion from the content window 1402. A third action component may use a generative output engine to generate a summary 1460 based on the content portion from the content window 1402.

In some examples, a single prompt may be used to generate the key points 1440, the action items 1450, and the summary 1460.

In one or more embodiments, the key points 1440, action items 1450, and summary 1460 are based on values generated by a generative output engine, as further described herein. In one or more embodiments, values for the key points 1440, action items 1450, and summary 1460 may be generated by the generative output engine in response to one or more action prompts that includes at least a portion of the content portion, indications of an output format for key points, an output format for action items, and an output format for a summary paragraph.

In other embodiments, multiple API calls may be used to obtain equivalent responses according to the output format that includes the values for the key points 1440, action items 1450, and summary 1460. For example, a first API call can include a first prompt that includes at least a portion of the transcript along with an indication of the format for a list containing the key points from the meeting, a second API call can include a second prompt that includes at least a portion of the transcript along with an indication of the format for a task list, and a third API call can include a third prompt that includes at least a portion of the transcript along with an indication of the format for the paragraph-style summary.

In some embodiments, the content portion from the content window 1402 may include non-text content. For example, the original content portion from the content window 1402 may have included one or more images (not shown) that are then included in the summary 1460 that is generated. In other examples, the content portion from the content window 1402 may have included a selectable graphical object 1466 that is then included in the summary 1460 that is generated.

In one or more embodiments, post processing may be performed. In one example, the post-processing includes searching the natural language string of a generative response to match individual names to references of a platform. The platform may maintain a database of users in database 118, including usernames for each of the users. More generally system 100 may also maintain a database of users applicable across multiple platforms of the system. The transcript processing service may use one or more matching algorithms or techniques (e.g., a fuzzy, or approximate, name matching algorithm) to identify names and match names to the database of users. In the example of frontend interface 1400, the centralized automation rule service 112 identified two names with the generative response for the action items, and replaced the textual names with references to the usernames of the corresponding users, @Username1 1452 and @Username2 1454. The centralized automation rule service 112 also identified two names with the generative response for the summary 1460, and replaced the textual names with references to two usernames, @Username1 and @Username2 1462.

In another example, the post-processing includes searching the natural language string of the generative response to match teams names to teams references of the platform. Similar to individual usernames, team names may be matched from a database of team names. In the example of summary 1460, the centralized automation rule service 112 identified one team name within the generative response for the summary 1460, and replaced the team name with a reference to the team name, @Team 1464.

The references that are mappable can also include references to objects of one or more platforms of the system 100, such as a page of a documentation platform, a ticket of an issue tracking platform, a board of a board system platform, of a card of a project management platform. In some examples, the references to objects within the system 100 can be in the form of selectable graphical objects. In one or more embodiments, post-processing includes searching the natural language string of the generative response to match references to content of one or more platforms of the system 100. In the illustrated example of frontend interface 1400, the post-processing has identified a reference to a different page (e.g., other than the instant draft page) and replaced the text or inserted a selectable graphical object 1466 with the identified page as the target content.

In some embodiments, the frontend interface 1400 is presented to the user as a draft message. The user can select to send via a send input 1470 the draft message, or cancel via a cancel input 1472. In some embodiments, the draft message may be presented to the user in an editable form, so that the user can update text, references, or other aspects of the draft message prior to sending.

Figure 15:
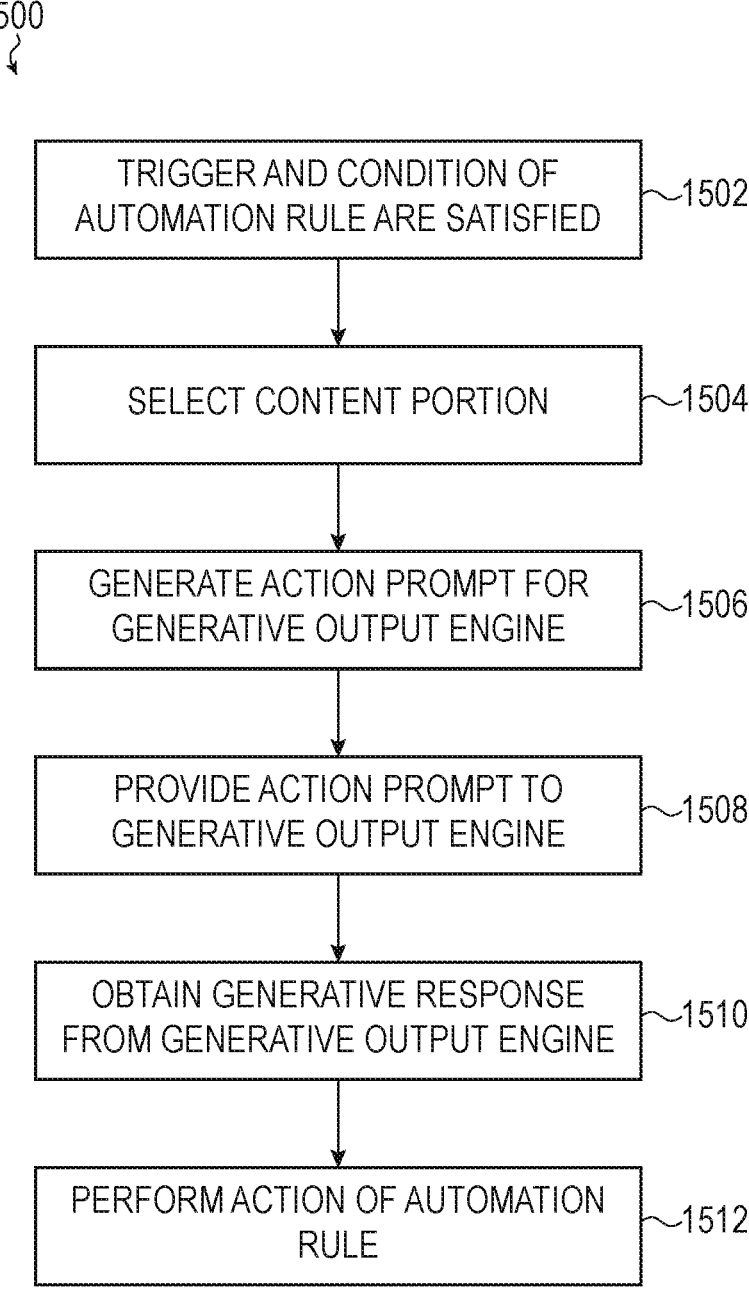
FIG. 15 depicts an example method of automated content assessment.

FIG. 15 shows an example method 1500 for automated content assessment within a collaboration system, for example in collaboration platforms, according to one or more aspects described herein. In one or more embodiments, method 1500 supports one or more aspects of automation rule creation, as further described herein, for example with reference to any one or more of FIGS. 1-10.

At 1502, the method 1500 includes the trigger component and condition component of an automation rule are satisfied. In some embodiment, the condition may be a condition that uses a generative output engine as further described herein.

At 1504, the method 1500 includes selecting a content portion. In one or more embodiments, the method 1500 includes, in response to determining that the condition component is satisfied, selecting, according to an action component of the automation rule, the content portion from the object.

At 1506, the method 1500 includes generating an action prompt for a generative output engine. In one or more embodiments, the method 1500 includes, in response to determining that the condition component is satisfied, generating an action prompt comprising the content portion (e.g., a text string) and an indication of an output format for a second generative response.

At 1508, the method 1500 includes proving the action prompt to the generative output engine. In one or more embodiments, the method 1500 includes, in response to determining that the condition component is satisfied, providing the action prompt to the generative output engine using a second application program interface call.

At 1510, the method 1500 includes obtaining a generative response form the generative output engine. In one or more embodiments, the method 1500 includes, obtaining the second generative response from the generative output engine responsive to the second application program interface call.

At 1512, the method 1500 includes performing an action of the automation rule. In one or more embodiments, the method 1500 includes, creating or modifying content of the documentation platform using the second generative response, for example according to one or more actions or action components of the automation rule.

In one or more embodiments, the method 1500 further includes, determining the content portion referenced by the condition component includes determining a referenced object based at least in part on a dynamic text reference of the automation rule, and selecting the content portion from the referenced object.

In some embodiments, the documentation platform includes a first platform of the collaboration system, and the referenced object is associated with content of a second platform of the collaboration system different from the first platform.

In some embodiments, the indication of the output format for the second generative response includes an indication to summarize the content portion. The action prompt may further include a set of example input-output content to summary pairs. The second generative response may include a summary of the content portion. In some embodiments, creating or modifying content of the collaboration system using the second generative response includes sending an email that includes the summary of the content portion.

In some embodiments, the indication of the output format for the second generative response includes an indication to provide a list of action items derived from the content portion. The action prompt may further include a set of example input-output content to list of action item pairs. The second generative response may further include the list of action items derived from the content portion. In some embodiments, creating or modifying content of the collaboration system using the second generative response includes sending an email comprising the list of action items.

In some embodiments, the indication of the output format for the second generative response includes an indication to provide a translation of the content portion. The second generative response includes the translation of the content portion, and the object includes a first object. In one or more embodiments, the method 1200 further includes creating a second object associated with the page of the collaboration system. The page may include the translation of the content portion.

The method 1500 may be variously embodied, extended, or adapted, as described in the following paragraphs and elsewhere in this description.

Figure 16:
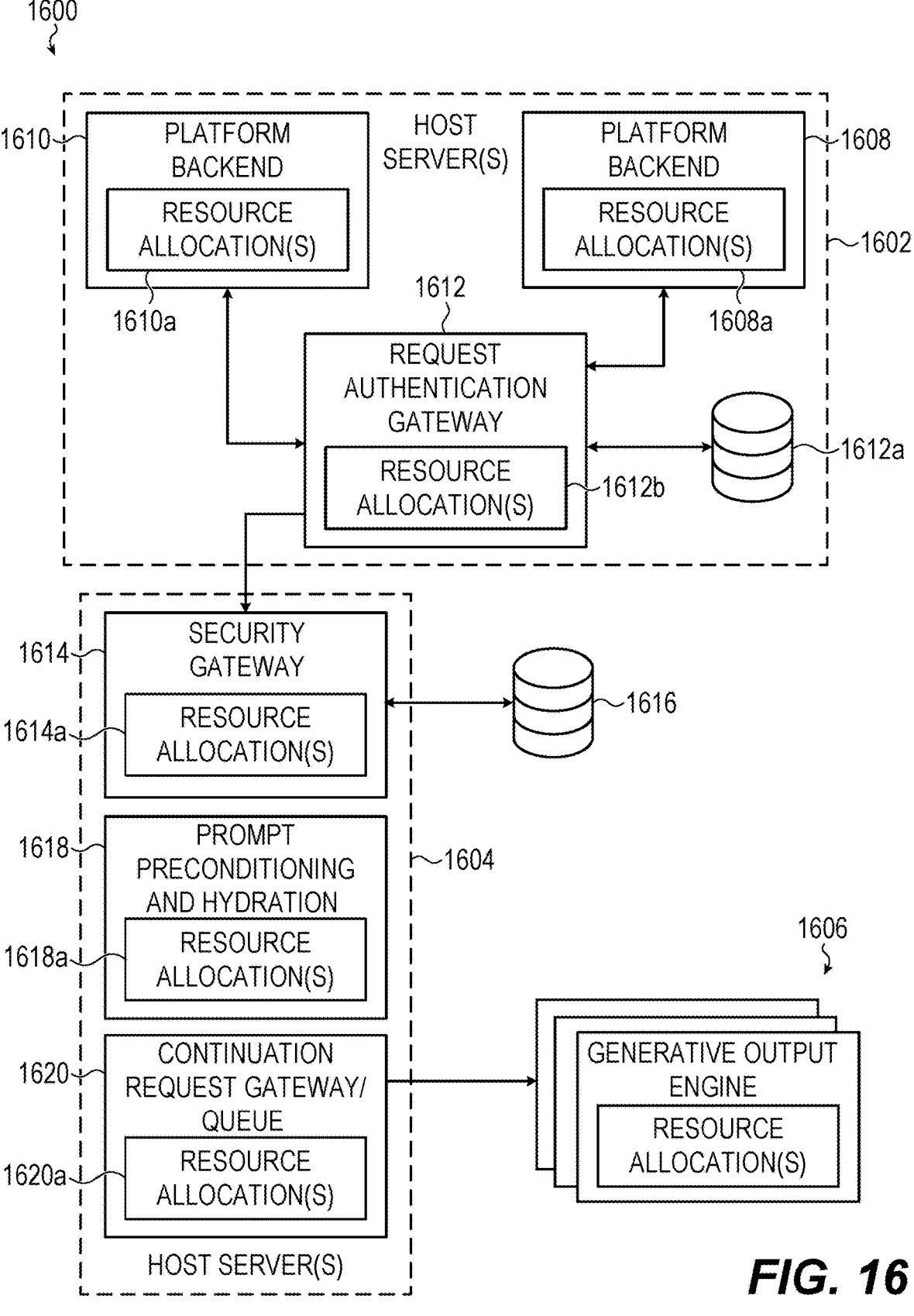
FIG. 16 depicts a system diagram and network/communication architectures that may support a system as described herein.

FIG. 16 depicts a system diagram and network/communication architectures that may support a system as described herein. The system 1600 includes a first set of host servers 1602 associated with one or more software platform backends. These software platform backends can be communicably coupled to a second set of host servers 1604 purpose configured to process requests and responses to and from one or more generative output engines 1606.

Specifically, the first set of host servers 1602 (which, as described above can include processors, memory, storage, network communications, and any other suitable physical hardware cooperating to instantiate software) can allocate certain resources to instantiate a first and second platform backend, such as a first platform backend 1608 and a second platform backend 1610. Each of these respective backends can be instantiated by cooperation of processing and memory resources associated to each respective backend. As illustrated, such dedicated resources are identified as the resource allocations 1608*a* and the resource allocations 1610*a*.

Each of these platform backends can be communicably coupled to an authentication gateway 1612 configured to verify, by querying a permissions table, directory service, or other authentication system (represented by the database 1612*a*) whether a particular request for generative output from a particular user is authorized. Specifically, the second platform backend 1610 may be a documentation platform used by a user operating a frontend thereof.

The user may not have access to information stored in an issue tracking system. In this example, if the user submits a request through the frontend of the documentation platform to the backend of the documentation platform that in any way references the issue tracking system, the authentication gateway 1612 can deny the request for insufficient permissions. This example is merely one and is not intended to be limiting; many possible authorization and authentication operations can be performed by the authentication gateway 1612. The authentication gateway 1612 may be supported by physical hardware resources, such as a processor and memory, represented by the resource allocations 1612*b*.

Once the authentication gateway 1612 determines that a request from a user of either platform is authorized to access data or resources implicated in service that request, the request may be passed to a security gateway 1614, which may be a software instance supported by physical hardware identified in FIG. 16 as the resource allocations 1614*a*. The security gateway 1614 may be configured to determine whether the request itself conforms to one or more policies or rules (data and/or executable representations of which may be stored in a database 1616) established by the organization. For example, the organization may prohibit executing prompts for offensive content, value-incompatible content, personally identifying information, health information, trade secret information, unreleased product information, secret project information, and the like. In other cases, a request may be denied by the security gateway 1614 if the prompt requests are beyond a threshold quantity of data.

Once a particular user-initiated prompt has been sufficiently authorized and cleared against organization-specific generative output rules, the request/prompt can be passed to a preconditioning and hydration service 1618 configured to populate request-contextualizing data (e.g., user ID, page ID, project ID, URLs, addresses, times, dates, date ranges, and so on), insert the user's request into a larger engineered template prompt and so on. Example operations of a preconditioning instance are described elsewhere herein; this description is not repeated. The preconditioning and hydration service 1618 can be a software instance supported by physical hardware represented by the resource allocations 1618*a*. In some implementations, the hydration service 1618 may also be used to rehydrate personally identifiable information (PII) or other potentially sensitive data that has been extracted from a request or data exchange in the system.

One a prompt has been modified, replaced, or hydrated by the preconditioning and hydration service 1618, it may be passed to an output gateway 1620 (also referred to as a continuation gateway or an output queue). The output gateway 1620 may be responsible for enqueuing and/or ordering different requests from different users or different software platforms based on priority, time order, or other metrics. The output gateway 1620 can also serve to meter requests to the generative output engines 1606.

Figure 17:
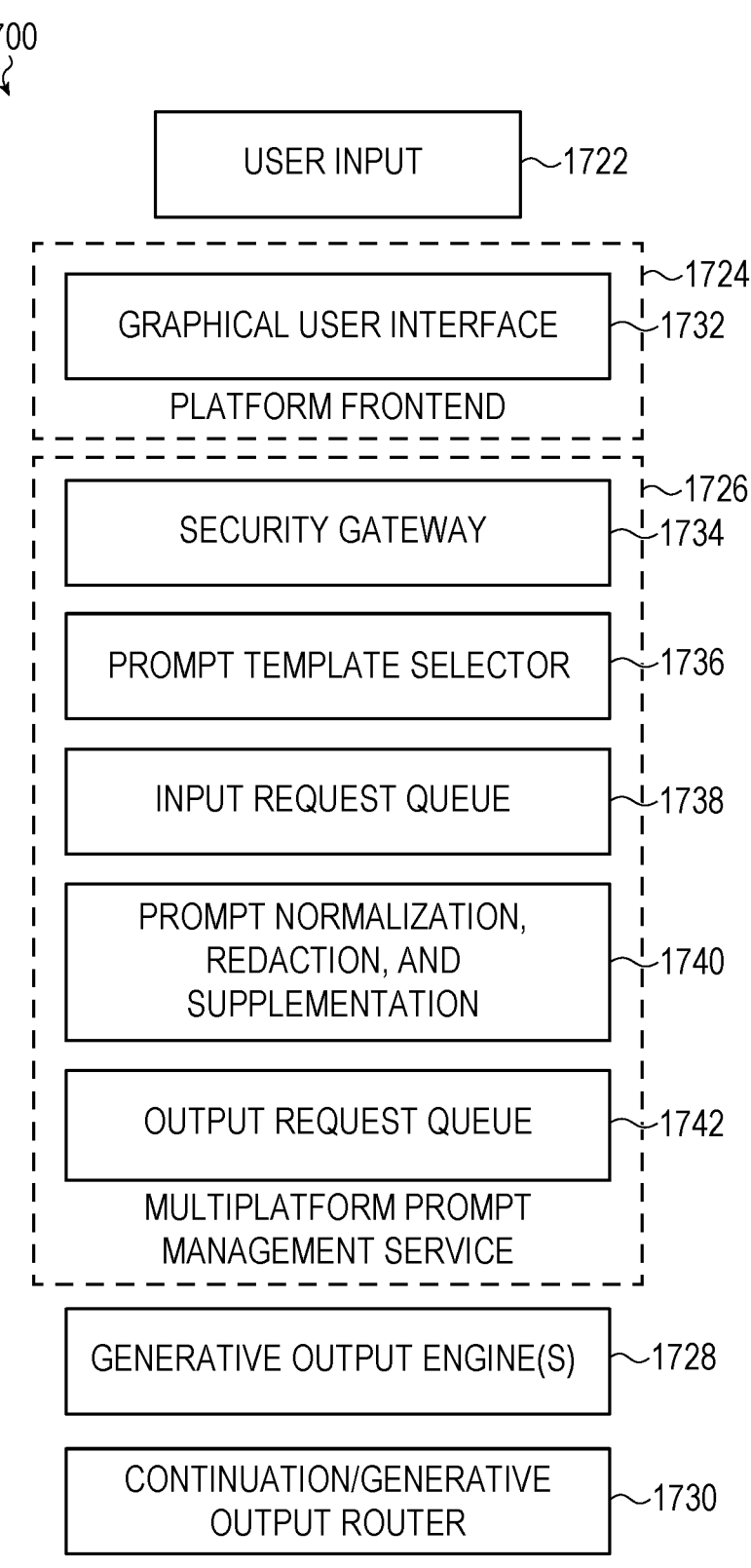
FIG. 17 depicts a functional system diagram of network/communication architectures that may support a system as described herein.

FIG. 17 depicts a functional system diagram of the system 1600. In particular, the system 1700 is configured to operate as a multiplatform prompt management service supporting and ordering requests from multiple users across multiple platforms. In particular, a user input 1722 may be received at a platform frontend 1724. The platform frontend 1724 passes the input to a prompt management service 1726 that formalizes a prompt suitable for input to a generative output engine 1728, which in turn can provide its output to an output router 1760 that may direct generative output to a suitable destination. For example, the output router 1760 may execute API requests generated by the generative output engine 1728, may submit text responses back to the platform frontend 1724, may wrap a text output of the generative output engine 1728 in an API request to update a backend of the platform associated with the platform frontend 1724, or may perform other operations.

Specifically, the user input 1722 (which may be an engagement with a button, typed text input, spoken input, chat box input, and the like) can be provided to a GUI 1732 of the platform frontend 1724. The GUI 1732 can be communicably coupled to a security gateway 1734 of the prompt management service 1726 that may be configured to determine whether the user input 1722 is authorized to execute and/or complies with organization-specific rules.

The security gateway 1734 may provide output to a prompt selector 1736 which can be configured to select a prompt template from a database of preconfigured prompts, templatized prompts, or engineered templatized prompts. Once the raw user input is transformed into a string prompt, the prompt may be provided as input to a request queue 1738 that orders different user request for input from the generative output engine 1728. Output of the request queue 1738 can be provided as input to a prompt hydrator 1740 configured to populate template fields, add context identifiers, supplement the prompt, and perform other normalization operations described herein. In other cases, the prompt hydrator 1740 can be configured to segment a single prompt into multiple discrete requests, which may be interdependent or may be independent.

Thereafter, the modified prompt(s) can be provided as input to an output queue at 1742 that may serve to meter inputs provided to the generative output engine 1728.

These foregoing embodiments depicted in FIGS. 16-17 and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

Figure 18:
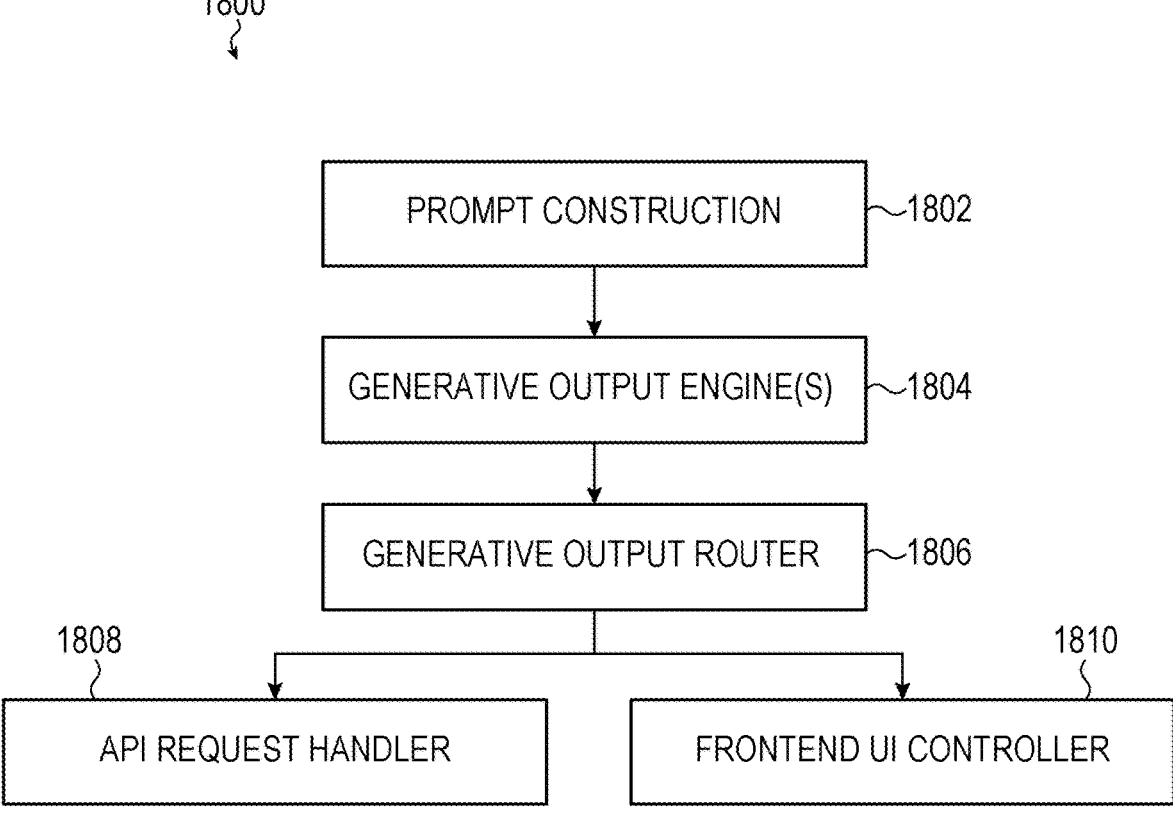
FIG. 18 depicts a simplified system diagram and data processing pipeline.

Although many constructions are possible, FIG. 18 depicts a simplified system diagram and data processing pipeline as described herein. The system 1800 receives user input, and constructs a prompt therefrom at operation 1802. After constructing a suitable prompt, and populating template fields, selecting appropriate instructions and examples for an LLM to continue, the modified constructed prompt is provided as input to a generative output engine 1804. A continuation from the generative output engine 1804 is provided as input to a router 1806 configured to classify the output of the generative output engine 1804 as being directed to one or more destinations. For example, the router 1806 may determine that a particular generative output is an API request that should be executed against a particular API (e.g., such as an API of a system or platform as described herein). In this example, the router 1806 may direct the output to an API request handler 1808. In another example, the router 1806 may determine that the generative output may be suitably directed to a GUI/frontend. For example, a generative output may include suggestions to be shown to a user below a user's partial input, such as shown in FIGS. 3-10.

Figure 19:
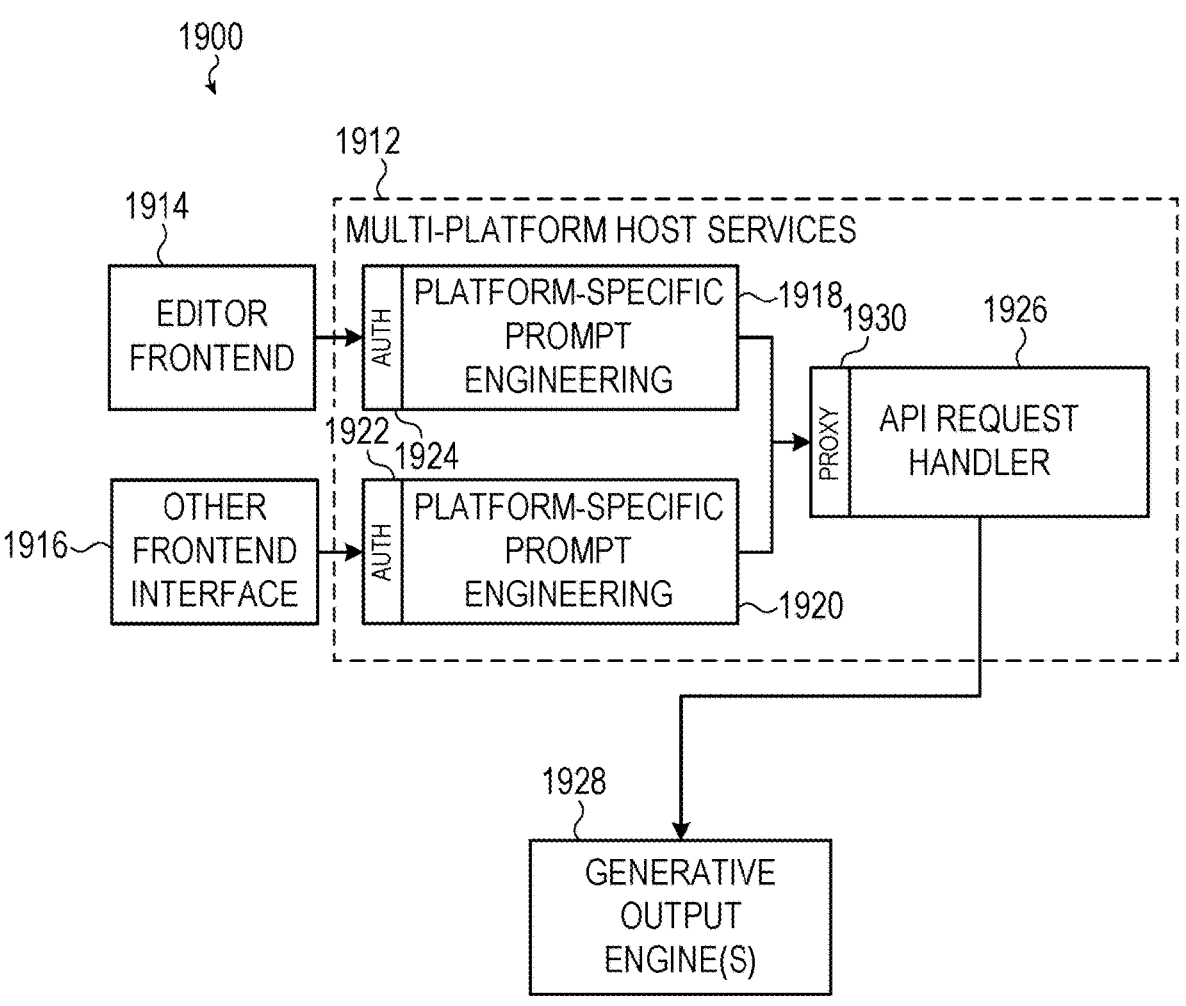
FIG. 19 depicts a system providing multiplatform prompt management as a service.

Another example architecture is shown in FIG. 19, illustrating a system providing prompt management, and in particular multiplatform prompt management as a service. The system 1900 is instantiated over cloud resources, which may be provisioned from a pool of resources in one or more locations (e.g., datacenters). In the illustrated embodiment, the provisioned resources are identified as the multi-platform host services 1912.

The multi-platform host services 1912 can receive input from one or more users in a variety of ways. For example, some users may provide input via an editor region 1914 of a frontend, such as described above. Other users may provide input by engaging with other user interface elements 1916 unrelated to common or shared features across multiple platforms. Specifically, the second user may provide input to the multi-platform host services 1912 by engaging with one or more platform-specific user interface elements. In yet further examples, one or more frontends or backends can be configured to automatically generate one or more prompts for continuation by generative output engines as described herein. More generally, in many cases, user input may not be required and prompts may be requested and/or engineered automatically.

The multi-platform host services 1912 can include multiple software instances or microservices each configured to receive user inputs and/or proposed prompts and configured to provide, as output, an engineered prompt. In many cases, these instances—shown in the figure as the platform-specific prompt engineering services 1918, 1920—can be configured to wrap proposed prompts within engineered prompts retrieved from a database such as described above.

In many cases, the platform-specific prompt engineering services 1918, 1920 can be each configured to authenticate requests received from various sources. In other cases, requests from editor regions or other user interface elements of particular frontends can be first received by one or more authenticator instances, such as the authentication instances 1922, 1924. In other cases, a single centralized authentication service can provide authentication as a service to each request before it is forwarded to the platform-specific prompt engineering services 1918, 1920.

Once a prompt has been engineered/supplemented by one of the platform-specific prompt engineering services 1918, 1920, it may be passed to a request queue/API request handler 1926 configured to generate an API request directed to a generative output engine 1928 including appropriate API tokens and the engineered prompt as a portion of the body of the API request. In some cases, a service proxy 1930 can interpose the platform-specific prompt engineering services 1918, 1920 and the request queue/API request handler 1926, so as to further modify or validate prompts prior to wrapping those prompts in an API call to the generative output engine 1928 by the request queue/API request handler 1926 although this is not required of all embodiments.

These foregoing embodiments depicted in FIGS. 16-19 and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

More generally, it may be appreciated that a system as described herein can be used for a variety of purposes and functions to enhance functionality of collaboration tools. Detailed examples follow. Similarly, it may be appreciated that systems as described herein can be configured to operate in a number of ways, which may be implementation specific.

For example, it may be appreciated that information security and privacy can be protected and secured in a number of suitable ways. For example, in some cases, a single generative output engine or system may be used by a multiplatform collaboration system as described herein. In this architecture, authentication, validation, and authorization decisions in respect of business rules regarding requests to the generative output engine can be centralized, ensuring auditable control over input to a generative output engine or service and auditable control over output from the generative output engine. In some constructions, authentication to the generative output engine's services may be checked multiple times, by multiple services or service proxies. In some cases, a generative output engine can be configured to leverage different training data in response to differently-authenticated requests. In other cases, unauthorized requests for information or generative output may be denied before the request is forwarded to a generative output engine, thereby protecting tenant-owned information within a secure internal system. It may be appreciated that many constructions are possible.

Additionally, some generative output engines can be configured to discard input and output once a request has been serviced, thereby retaining zero data. Such constructions may be useful to generate output in respect of confidential or otherwise sensitive information. In other cases, such a configuration can enable multi-tenant use of the same generative output engine or service, without risking that prior requests by one tenant inform future training that in turn informs a generative output provided to a second tenant. Broadly, some generative output engines and systems can retain data and leverage that data for training and functionality improvement purposes, whereas other systems can be configured for zero data retention.

In some cases, requests may be limited in frequency, total number, or in scope of information requestable within a threshold period of time. These limitations (which may be applied on the user level, role level, tenant level, product level, and so on) can prevent monopolization of a generative output engine (especially when accessed in a centralized manner) by a single requester. Many constructions are possible.

Figure 20:
FIG. 20 shows a sample electrical block diagram of an electronic device that may perform the operations described herein.
Figure 20:
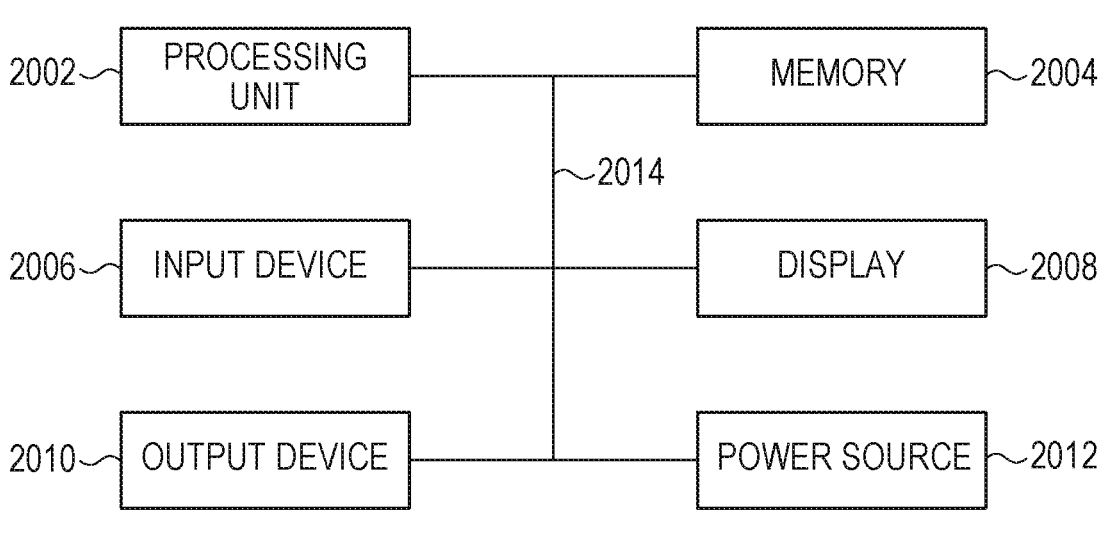

FIG. 20 shows a sample electrical block diagram of an electronic device 2000 that may perform the operations described herein. The electronic device 2000 may in some cases take the form of any of the electronic devices described with reference to FIGS. 1-19, including client devices, and/or servers or other computing devices associated with the system 100. The electronic device 2000 can include one or more of a processing unit 2002, a memory 2004 or storage device, input devices 2006, a display 2008, output devices 2010, and a power source 2012. In some cases, various implementations of the electronic device 2000 may lack some or all of these components and/or include additional or alternative components.

The processing unit 2002 can control some or all of the operations of the electronic device 2000. The processing unit 2002 can communicate, either directly or indirectly, with some or all of the components of the electronic device 2000. For example, a system bus or other communication mechanism 2014 can provide communication between the processing unit 2002, the power source 2012, the memory 2004, the input device(s) 2006, and the output device(s) 2010.

The processing unit 2002 can be implemented as any electronic device capable of processing, receiving, or transmitting data or instructions. For example, the processing unit 2002 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 2000 can be controlled by multiple processing units. For example, select components of the electronic device 2000 (e.g., an input device 2006) may be controlled by a first processing unit and other components of the electronic device 2000 (e.g., the display 2008) may be controlled by a second processing unit, where the first and second processing units may or may not be in communication with each other.

The power source 2012 can be implemented with any device capable of providing energy to the electronic device 2000. For example, the power source 2012 may be one or more batteries or rechargeable batteries. Additionally, or alternatively, the power source 2012 can be a power connector or power cord that connects the electronic device 2000 to another power source, such as a wall outlet.

The memory 2004 can store electronic data that can be used by the electronic device 2000. For example, the memory 2004 can store electronic data or content such as, for example, audio and video files, documents and applications, device settings and user preferences, timing signals, control signals, and data structures or databases. The memory 2004 can be configured as any type of memory. By way of example only, the memory 2004 can be implemented as random access memory, read-only memory, flash memory, removable memory, other types of storage elements, or combinations of such devices.

In various embodiments, the display 2008 provides a graphical output, for example associated with an operating system, user interface, and/or applications of the electronic device 2000 (e.g., a chat user interface, an issue-tracking user interface, an issue-discovery user interface, etc.). In one embodiment, the display 2008 includes one or more sensors and is configured as a touch-sensitive (e.g., single-touch, multi-touch) and/or force-sensitive display to receive inputs from a user. For example, the display 2008 may be integrated with a touch sensor (e.g., a capacitive touch sensor) and/or a force sensor to provide a touch- and/or force-sensitive display. The display 2008 is operably coupled to the processing unit 2002 of the electronic device 2000.

The display 2008 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 2008 is positioned beneath and viewable through a cover that forms at least a portion of an enclosure of the electronic device 2000.

In various embodiments, the input devices 2006 may include any suitable components for detecting inputs. Examples of input devices 2006 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 2006 may be configured to detect one or more particular types of input and provide a signal (e.g., an input signal) corresponding to the detected input. The signal may be provided, for example, to the processing unit 2002.

As discussed above, in some cases, the input device(s) 2006 include a touch sensor (e.g., a capacitive touch sensor) integrated with the display 2008 to provide a touch-sensitive display. Similarly, in some cases, the input device(s) 2006 include a force sensor (e.g., a capacitive force sensor) integrated with the display 2008 to provide a force-sensitive display.

The output devices 2010 may include any suitable components for providing outputs. Examples of output devices 2010 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device of the output devices 2010 may be configured to receive one or more signals (e.g., an output signal provided by the processing unit 2002) and provide an output corresponding to the signal.

In some cases, input devices 2006 and output devices 2010 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 2002 may be operably coupled to the input devices 2006 and the output devices 2010. The processing unit 2002 may be adapted to exchange signals with the input devices 2006 and the output devices 2010. For example, the processing unit 2002 may receive an input signal from an input device 2006 that corresponds to an input detected by the input device 2006. The processing unit 2002 may interpret the received input signal to determine whether to provide and/or change one or more outputs in response to the input signal. The processing unit 2002 may then send an output signal to one or more of the output devices 2010, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described, and whether or not such features are presented as being a part of a described embodiment. Thus, the breadth and scope of the present invention should not be limited by any of the above-described exemplary embodiments but is instead defined by the claims herein presented.

Furthermore, the foregoing examples and description of instances of purpose-configured software, whether accessible via API as a request-response service, an event-driven service, or whether configured as a self-contained data processing service are understood as not exhaustive. The various functions and operations of a system, such as described herein, can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A computer-implemented method for collaboration content generation within a collaboration system, the method comprising:

in response to detecting that an object associated with a page of a documentation platform has been created or modified by a user, evaluating a criteria of a trigger component of an automation rule to determine that the criteria is satisfied by the object being created or modified;

in response to determining that the trigger component is satisfied:

selecting, according to a condition component of the automation rule, a content portion from the object associated with the page, the object referenced by the condition component;

generating a condition prompt comprising the content portion, one or more classifier strings for the content portion, and a set of example input-output content to classifier pairs;

providing the condition prompt to a generative output engine using a first application program interface call;

obtaining a first generative response from the generative output engine responsive to the first application program interface call; and determining that the condition component of the automation rule is satisfied based on the first generative response; and in response to determining that the condition component is satisfied, performing one or more next components of the automation rule, wherein performing the one or more next components comprises:

selecting, according to an action component of the automation rule, the content portion from the object;

generating an action prompt comprising the content portion and an indication of an output format for a second generative response;

providing the action prompt to the generative output engine using a second application program interface call; and obtaining the second generative response from the generative output engine responsive to the second application program interface call; and creating or modifying content of the documentation platform using the second generative response.

2. The computer-implemented method of claim 1, wherein determining the content portion referenced by the condition component comprises:

identifying a referenced object based at least in part on a dynamic text reference of the automation rule; and selecting the content portion from the referenced object.

3. The computer-implemented method of claim 2, wherein:

the documentation platform comprises a first platform of the collaboration system; and the referenced object is associated with content of a second platform of the collaboration system different from the first platform.

4. The computer-implemented method of claim 1, wherein:

the indication of the output format for the second generative response comprises an indication to summarize the content portion;

the action prompt further comprises a set of example input-output content to summary pairs;

the second generative response comprises a summary of the content portion; and creating or modifying content of the collaboration system using the second generative response comprises sending an email comprising the summary of the content portion.

5. The computer-implemented method of claim 1, wherein:

the indication of the output format for the second generative response comprises an indication to provide a list of action items derived from the content portion;

the action prompt further comprises a set of example input-output content to list of action item pairs;

the second generative response comprises the list of action items derived from the content portion; and creating or modifying content of the collaboration system using the second generative response comprises sending an email comprising the list of action items.

6. The computer-implemented method of claim 1, wherein:

the indication of the output format for the second generative response comprises an indication to provide a translation of the content portion;

the second generative response comprises the translation of the content portion;

the object comprises a first object; and the method further comprises creating a second object associated with the page of the collaboration system, the page including the translation of the content portion.

7. The computer-implemented method of claim 1, wherein the content portion has been modified by the user, the first generative response includes an indication that a modification of the content portion is complete, and performing the one or more next components comprises:

sending an email to the user indicating for the user to verify that the modification of the content portion is complete;

in response to the email to the user, receiving an indication that the user has verified the modification of the content portion being complete; and in response to receiving the indication, associating a marker with the object associated with the content portion, the marker indicating that the modification of the content portion is complete.

8. The computer-implemented method of claim 1, wherein the content portion has been modified by the user, the first generative response includes an indication that a modification of the content portion is complete, and performing the one or more next components comprises:

associating a marker with the object associated with the content portion, the marker indicating that the modification of the content portion is complete; and sending an email to the user indicating for the user to confirm that the modification of the content portion is complete.

9. A collaboration system, comprising:

a first interface configured to communicate with at least one client device;

a second interface configured to communicate with a generative output engine; and a centralized automation rule service coupled with the first interface and the second interface, the centralized automation rule service comprising executable instructions stored in memory and executed by one or more processors to:

detect that an object associated with a page of a documentation platform has been created or modified by a user; and in response to detecting that the object has been created or modified by the user, evaluate a criteria of a trigger component of an automation rule to determine that the criteria is satisfied by the object being created or modified;

in response to the trigger component being satisfied:

generate, according to a condition component of the automation rule, a condition prompt comprising a content portion from the object associated with the page, the object referenced by the condition component, one or more classifier strings, and a set of example input-output content to classifier pairs;

provide, via the second interface, the condition prompt to the generative output engine using a first application program interface call;

obtain, via the second interface, a first generative response from the generative output engine responsive to the first application program interface call; and determine that the condition component of the automation rule is satisfied based on the first generative response; and in response to the condition component being satisfied, perform one or more next components of the automation rule, wherein performing the one or more next components comprises:

select, according to an action component of the automation rule, the content portion from the object;

generate an action prompt comprising the content portion and an indication of an output format for a second generative response;

provide, via the second interface, the action prompt to the generative output engine using a second application program interface call; and obtain, via the second interface, the second generative response from the generative output engine responsive to the second application program interface call; and create or modify content of the collaboration system using the second generative response.

10. The collaboration system of claim 9, further comprising:

the indication of the output format for the second generative response comprises an indication to summarize the content portion;

the action prompt further comprises a set of example input-output content to summary pairs;

the second generative response comprises a summary of the content portion; and creating or modifying content of the collaboration system using the second generative response comprises sending an email, to the at least one client device, comprising the summary of the content portion.

11. The collaboration system of claim 9, further comprising:

the indication of the output format for the second generative response comprises an indication to provide a list of action items derived from the content portion;

the action prompt further comprises a set of example input-output content to list of action item pairs;

the second generative response comprises the list of action item pairs derived from the content portion; and creating or modifying content of the collaboration system using the second generative response comprises sending an email, to the at least one client device, comprising the list of action items.

12. The collaboration system of claim 9, wherein the centralized automation rule service, via execution of the executable instructions, further operates to:

determine a referenced object based at least in part on a dynamic text reference of the automation rule; and select the content portion from the referenced object.

13. The collaboration system of claim 9, wherein the centralized automation rule service, via execution of the executable instructions, further operates to:

select the content portion from the object associated with the content created or modified by the user of the collaboration system.

14. The collaboration system of claim 9, further comprising:

a first platform comprising executable instructions stored in memory and executed by the one or more processors to communicate with the centralized automation rule service; and a second platform comprising executable instructions stored in memory and executed by the one or more processors to communicate with the centralized automation rule service, the second platform different from the first platform, wherein:

the object of the collaboration system comprises a first object of the first platform; and the one or more next components is performed on a second object associated with second content of the second platform.

15. A computer-implemented method for automation rule creation within a collaboration system, the method comprising:

causing generation of a graphical user interface of the collaboration system, the graphical user interface including a first input field for receiving user input;

in response to receiving a first input of the graphical user interface indicating a selection of a trigger component for an automation rule, the trigger component associated with a change to an object of the collaboration system:

causing generation of a first one or more graphical elements representing the trigger component; and causing generation of a second one or more graphical elements representing a set of candidate condition components for the automation rule;

in response to receiving a selection of a condition component of the set of candidate condition components that uses a generative output engine:

causing generation of a second input field for receiving user input indicating, for the condition component, a content portion of the object of the collaboration system; and causing generation of a third input field for receiving user input indicating one or more classifier strings for the content portion;

in response to receiving a second input to the graphical user interface indicating the content portion and a third input to the graphical user interface indicating the one or more classifier strings:

causing generation of a third one or more graphical elements representing the condition component; and causing generation of a fourth one or more graphical elements representing a set of next components for the automation rule; and in response to receiving a fourth input of the graphical user interface indicating for the collaboration system to save the automation rule that includes the trigger component, the condition component that uses the generative output engine, and one or more next components of the set of next components:

generating a service on the collaboration system that obtains, for the condition component, a first generative response from the generative output engine in response to an event satisfying the trigger component, and performs an operation in response to a condition satisfying the condition component, wherein the operation corresponds to creating or modifying content according to the one or more next components.

16. The method of claim 15, wherein:

the object of the collaboration system comprises a page of a documentation platform;

the content portion of the object of the collaboration system comprises a body of the page or a title of the page; and the one or more classifier strings relate to the body or the title.

17. The method of claim 15, wherein:

in response to receiving a selection of an action component that uses the generative output engine, the one or more next components for the automation rule comprising the action component:

causing generation of a set of action components that are selectable for inclusion in the automation rule, wherein at least one action component of the set of action components uses the generative output engine when an action of the action component is performed;

in response to a selection of the action component that uses the generative output engine:

causing generation of the fourth one or more graphical elements representing the action component that uses the generative output engine.

18. The method of claim 15, wherein:

the object of the collaboration system comprises a first object of a first platform comprising executable instructions stored in memory and executed by one or more processors to communicate with a centralized automation rule service; and the one or more next components is performed on a second object associated with second content of a second platform comprising executable instructions stored in memory and executed by the one or more processors to communicate with the centralized automation rule service, the second platform different from the first platform.

* * * * *